(12) United States Patent
Linn et al.

(10) Patent No.: US 12,541,807 B2
(45) Date of Patent: Feb. 3, 2026

(54) MACHINE LEARNING SYSTEM AND METHOD FOR CONTEXTUAL DECISION-MAKING IN WATCHLIST SCREENING AND MONITORING

(71) Applicant: Socure, Inc., Incline Village, NV (US)

(72) Inventors: Joshua Linn, Incline Village, NV (US); Sumit Kumar, Incline Village, NV (US); Alex Austin, Incline Village, NV (US); Md Yasin Kabir, Incline Village, NV (US); Vignesh Sivakumar, Incline Village, NV (US); Ali Haddad, Incline Village, NV (US); Pablo Ysrrael Abreu, Incline Village, NV (US); Nikita Ganiga, Incline Village, NV (US)

(73) Assignee: Socure, Inc., Incline Village, NV (US)

( * ) Notice: Subject to any disclaimer, the term of this patent is extended or adjusted under 35 U.S.C. 154(b) by 0 days.

(21) Appl. No.: 18/634,448

(22) Filed: Apr. 12, 2024

(65) Prior Publication Data

US 2025/0322477 A1  Oct. 16, 2025

(51) Int. Cl.
G06Q 50/26 (2024.01)
G06Q 50/16 (2024.01)

(52) U.S. Cl.
CPC .......... *G06Q 50/265* (2013.01); *G06Q 50/16* (2013.01)

(58) Field of Classification Search
CPC .......... G06Q 30/0185; G06Q 20/4016; G06Q 50/16; G06Q 50/265
See application file for complete search history.

(56) References Cited

U.S. PATENT DOCUMENTS 9,641,528 B2  5/2017  Little et al.
9,686,217 B2  6/2017  Prabhu
(Continued)

FOREIGN PATENT DOCUMENTS

WO  2018215914 A1  11/2018

OTHER PUBLICATIONS

Alkhalili, Mohannad, Mahmoud H. Qutqut, and Fadi Almasalha. "Investigation of applying machine learning for watch-list filtering in anti-money laundering." iEEE Access 9 (2021): 18481-18496. (Year: 2021).*

(Continued)

*Primary Examiner* — Brendan S O'Shea
(74) *Attorney, Agent, or Firm* — Charles B. Lobsenz; Brian H. Buck; Potomac Law Group, PLLC

(57) ABSTRACT

Provided are a method and system for identity correlation between a transaction applicant (TA) and a watchlist entity (WE). Preexisting watchlist data and other aggregated identity data (AID) are processed to provide for comparison to a collective identity of at least the TA. Using various categorizations for the AID and the collective identity, watchlist tags are generated that can then be matched to the collective identity. As a result of the matching, a watchlist candidacy demonstrating a probability that the identity of the TA does or does not correspond to that of the WE can be generated. Various implementations of identity correlation results may be leveraged for different use cases including an automobile purchasing service, a corporate financing service, an aircraft monitoring service as well as others. Identities may comprise entities, physical objects, real estate or other items or concepts.

28 Claims, 18 Drawing Sheets

(56) References Cited

U.S. PATENT DOCUMENTS

| | | | |
|---|---|---|---|
| 10,108,791 B1 | 10/2018 | Masterman | |
| 10,410,125 B1 | 9/2019 | Finkelstein et al. | |
| 10,410,273 B1 | 9/2019 | Finkelstein et al. | |
| 10,432,605 B1 | 10/2019 | Lester et al. | |
| 10,726,123 B1 | 7/2020 | Mookiah et al. | |
| 10,733,619 B1 | 8/2020 | Newman | |
| 10,754,936 B1* | 8/2020 | Hawes | G06F 21/45 |
| 10,754,946 B1 | 8/2020 | Gribelyuk et al. | |
| 10,853,757 B1* | 12/2020 | Hill | G06Q 10/0833 |
| 10,956,916 B1 | 3/2021 | Abreu et al. | |
| 11,423,365 B2 | 8/2022 | Fidanza et al. | |
| 2002/0161731 A1 | 10/2002 | Tayebnejad et al. | |
| 2010/0305946 A1 | 12/2010 | Gutierrez et al. | |
| 2011/0016041 A1* | 1/2011 | Scragg | G06Q 40/00 705/38 |
| 2012/0109802 A1* | 5/2012 | Griffin | G06Q 40/00 705/35 |
| 2014/0067656 A1 | 3/2014 | Cohen Ganor et al. | |
| 2014/0282977 A1 | 9/2014 | Madhu et al. | |
| 2015/0142595 A1 | 5/2015 | Acuna-Rohter | |
| 2016/0239920 A1 | 8/2016 | Cunningham | |
| 2016/0371618 A1 | 12/2016 | Leidner et al. | |
| 2017/0286671 A1 | 10/2017 | Chari et al. | |
| 2017/0364917 A1 | 12/2017 | Karantzis | |
| 2018/0247268 A1 | 8/2018 | Vanasco | |
| 2018/0337937 A1 | 11/2018 | Saunders et al. | |
| 2018/0349901 A1 | 12/2018 | Chen et al. | |
| 2019/0156426 A1 | 5/2019 | Drucker et al. | |
| 2019/0340610 A1 | 11/2019 | Song et al. | |
| 2020/0272741 A1 | 8/2020 | Bhatia et al. | |
| 2020/0366671 A1 | 11/2020 | Larson et al. | |
| 2021/0042366 A1 | 2/2021 | Hicklin et al. | |
| 2021/0142329 A1 | 5/2021 | Aparício et al. | |
| 2021/0224922 A1* | 7/2021 | Juban | G06Q 20/4016 |
| 2021/0314331 A1 | 10/2021 | Singh | |
| 2022/0005332 A1 | 1/2022 | Metzler et al. | |
| 2022/0050838 A1 | 2/2022 | Piatetsky et al. | |
| 2022/0051255 A1 | 2/2022 | Abifaker et al. | |
| 2022/0067775 A1 | 3/2022 | Rahimi | |
| 2022/0270176 A1* | 8/2022 | Chintakindi | G06F 3/0482 |
| 2022/0366078 A1 | 11/2022 | Kirti et al. | |
| 2022/0407863 A1 | 12/2022 | Hen et al. | |
| 2023/0118380 A1 | 4/2023 | Krosinski | |
| 2023/0134651 A1 | 5/2023 | Agbamu | |
| 2023/0147934 A1 | 5/2023 | Eddin et al. | |
| 2023/0224324 A1* | 7/2023 | Karabey | H04L 63/1416 726/23 |
| 2023/0245139 A1 | 8/2023 | Shen et al. | |
| 2023/0267198 A1 | 8/2023 | Karpovsky et al. | |
| 2023/0273981 A1* | 8/2023 | Rapowitz | G06F 21/31 726/4 |
| 2023/0316261 A1 | 10/2023 | Agbamu | |
| 2023/0367821 A1 | 11/2023 | Hicklin et al. | |
| 2023/0376962 A1 | 11/2023 | Abreu et al. | |
| 2023/0388332 A1 | 11/2023 | Cunningham et al. | |
| 2024/0394662 A1 | 11/2024 | Maikhuri et al. | |

OTHER PUBLICATIONS

Unknown, "Entity Resolution Software," Senzing, www.senzing.com, 2024.

Han et al., "NextGen AML: Distributed Deep Learning based Language Technologies to Augment Anti Money Laundering Investigation," Proceedings of the 56th Annual Meeting of the Association for Computational Linguistics-System Demonstrations, pp. 37-42, Jul. 2018.

* cited by examiner

*FIG. 9*

Collective Identity – Corporate Entity    1400
Date of Request: 2/14/24   ID # UT-31-7X-P

| Type of Entity | Number of Employees |
|---|---|
| C Corp  1410 | 23  1440 |

| Entity Name | Bankruptcies |
|---|---|
| WidgetMax  1420 | No  1450 |

| Principals | Date of Formation |
|---|---|
| Joe Johnson<br>John Edwards  1430 | 2010  1460 |

FIG. 14

Aggregated Identity – Corporate Entity                1500
ID # ARC432-LK

Type of Entity

LLC
                                1510

Entity Name

Widgetopia
                                1520

Entity State

CA
                                1530

Principals

Joe Peterson
Edwin Joseph
                                1540

Previous Funding

ABC Financing
Regal Funding Group
                                1550

Bankruptcy Filing

MACHINE LEARNING SYSTEM AND METHOD FOR CONTEXTUAL DECISION-MAKING IN WATCHLIST SCREENING AND MONITORING

FIELD OF THE DISCLOSURE

Disclosed embodiments relate to identity matching associated with watchlists, and more specifically, to matching of an identity to a watchlist identity in connection with decision-making associated with various proposed activities.

BACKGROUND

A "watchlist" is ordinarily regarded as a listing of individuals (aka "watchlist entities "WEs") who, because of various suspicion(s) associated with past activity, are identified as having a propensity to be malevolent actors. When considering other candidate individuals (herein "transaction applicants" (TAs)) who, it may turn out, may or may not matches for WEs, identification thereof can be of great societal benefit in thwarting crime or potential engagement in crime.

Traditional manner of such identification is mainly reliant on review of widely circulated watchlists, whether the circulation is provided by government or private entities. That review, all too often, is manual in nature, meaning that persons employed by those entities must grapple with, for instance, comparison of enormous amounts of ever-changing listing and delisting of WEs. Due to what can be an overwhelming burden in conducting such manual review, various types of error can be introduced leading to missed or incorrect watchlist identifications. For instance, error can arise from inappropriate comparison for names provided on a watchlist and/or associated with candidate individuals due to, simply or not so simply, volume of name listings, name misspellings, a variety of incorrect or inadequate personally identifiable information (PII), lack of consideration of aliases, etc. Circumventing watchlist misidentification, i.e., otherwise confirming watchlist candidacy, in the face of these and other types of error is crucial to the integrity of intended transactions, whether they be in the private or public sector.

Another limitation of existing approaches for attempting to match TAs as against WEs relates to constraints on available data sources. In traditional approaches, it is typical to only source data from known data sources identified as providing traditional watchlist databases. In today's environment, there are many additional sources of data regarding individuals aside from these traditional, special purposed watchlist databases. For example, social media postings and news articles can provide additional and valuable data regarding individuals and their propensities for engaging in activities that might disqualify them from engaging in certain financial transactions and/or other online or offline activities.

The issue with the use of this externally sourced data is that it is largely unstructured, inconsistent in formatting and it typically takes human intervention to assess the content of the data (e.g. in a social media posting or in a news article relating to a specific individual) to determine whether it is relevant to that individual, whether it is relevant to decision making with respect to that individual seeking to process a transaction and, if relevant, in what way (e.g. a factor in disqualification, etc.). Because of the difficulty in normalizing the data extracted from these external sources as well as determining relevance, traditional decision making systems have not employed data from these external sources notwithstanding that it can be a valuable source of data enabling more accurate and effective decision making.

There are many scenarios and use cases in which it may be desirable to attempt to determine if a TA correlates to a WE in order to determine whether it is appropriate and/or desirable to allow the TA, or a service provider through whom the TA is working, to take some kind of action. One common case is a TA seeking to process a financial transaction such as open a new bank account, obtain a new credit card, obtain a mortgage etc. If there is a reasonable likelihood that the TA correlates to a WE, then the transaction may not be permitted to proceed, additional information may be required, manual assessment may be required and/or limitations and/or restrictions may be placed upon the proposed transaction.

Other use cases may involve TA's and/or WE's that are not individuals. Examples include corporate entities, organizations, vessels, automobiles etc. wherein it is desirable to determine likelihood of a match between two different "identities"—the first being an identity seeking to take some kind of action and the second being an identity that for one or more reasons should be considered for restriction or prohibition of the proposed action.

In all of these use cases, the same drawbacks as described above can apply. Namely, existing solutions may have difficulty in accurately assessing correlations resulting in either false positives (i.e. the transaction is not permitted to proceed, when in fact it should) and/or false negatives (i.e. the transaction is permitted to proceed, when in fact it should not). Also, existing solutions in connection with these use cases may require more manual/human involvement in decision making than is desirable.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments may include a method and system regarding determining watchlist candidacy, including receiving identity characteristics corresponding to a transaction applicant (TA), receiving identity characteristics corresponding to a watchlist entity (WE), and receiving one or more aggregated identity data (AID) corresponding to one or more of the TA and the WE. Extensive feature engineering around name, address, historical data is performed to maximize model accuracy. The method and system may further include determining for one or more of (a) the identity characteristics corresponding to a TA and (b) the identity characteristics corresponding to a WE, a respective collective identity of at least the TA, wherein the respective collective identities of the TA and WE are determined with respect to the AID. Additionally, the method and system may include converting at least the collective identity of the TA into first input for a first machine learning model, applying the first input to the first machine learning model and, in response, obtaining one or more watchlist tags, converting the watchlist tags into second input for a second machine learning model, and then applying the first input and the second input to at least the second machine learning model and, in response, obtaining a watchlist candidacy for the TA.

Additional embodiments may include methodologies and systems wherein external data sources such as news articles, social media postings and other sources of available information concerning individuals is sourced and used in connection with making determinations as to whether a TA should be permitted to proceed with a proposed transaction. The methodologies and systems may further include the use of natural language processing techniques as well as machine learning and artificial intelligence to capture and process information extracted from these external data sources such that they can generate or supplement a collective identity which is used by one or more system models in connection with watchlist matching efforts including, for example, assessing whether a TA is a likely match to one or more records associated with individuals and available in an aggregated identity database, and if so, determining what action should be taken connection with a proposed transaction sought by the TA.

In these regards, and as will be appreciated from the discussion(s) below, extensive feature engineering relative to one or more identity characteristics (e.g., name, address, historical data such as age) may be performed according to one or more aspects of the modeling herein to improve accuracy for a determination of watchlist candidacy of a TA with respect to a WE.

Some embodiments include use cases where the teachings of the present invention apply to TAs and/or WEs identities that are not individuals. In these embodiments, the identity may be, for example, a corporate entity, an organization, a vessel, an airplane, a boat, an automobile, or any other identity type wherein it is desirable to see if there is a correlation between the identity associated with the proposed transaction and an identity on a watchlist.

In other embodiments, the system and methodologies of the present invention may be employed with various web based services that benefit from the novel aspects described above and elsewhere herein. In particular, these services may include services such as dating websites, gambling websites, membership/organization websites and websites intended to permit individuals and/or companies to sell large ticket items to others. As will be readily apparent to one of skill in the art, the teachings of the present invention may also be applied to other website based services while remaining within the scope and spirit of the present invention.

BRIEF DESCRIPTION OF THE DRAWINGS

FIG. 9 illustrates a conceptual diagram of organizing one or more AID relative to a collective identity when determining watchlist tags;

FIG. 14 illustrates an exemplary collective identity generated from a TA and associated with a corporate entity as used in connection with a watchlist candidacy methodology for an exemplary web based business funding service; and FIG. 15 illustrates an exemplary aggregated identity generated from a WE and associated with a corporate entity as used in connection with a watchlist candidacy methodology for an exemplary web based business funding service;

DETAILED DESCRIPTION

Figure 1:
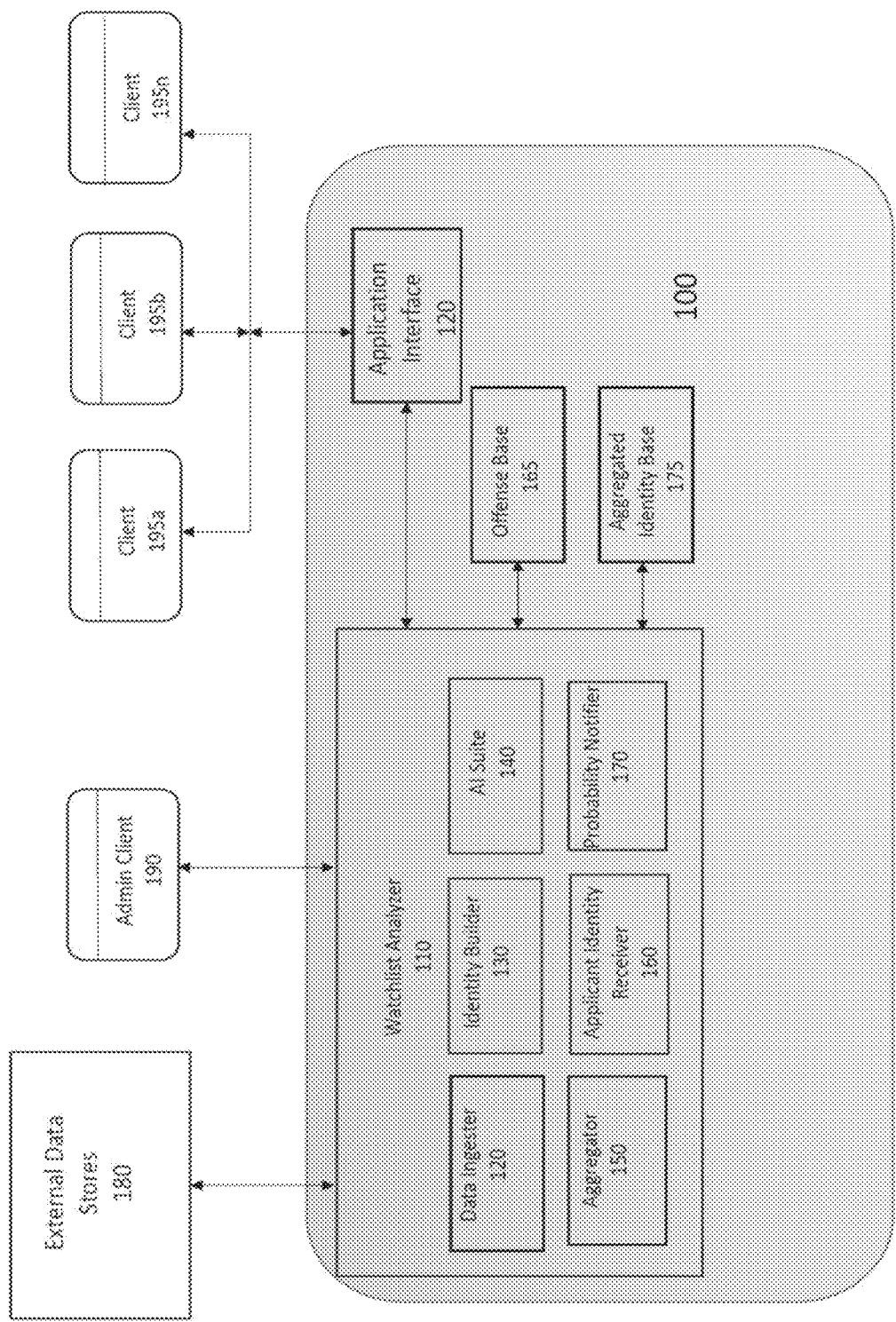
FIG. 1 illustrates elements of a Watchlist Comparison System (WCS) enabling inspection of a watchlist for an identity, according to embodiments herein.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments.

Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Aspects of the present disclosure are directed to identity correlations in connection with proposed transactions initiated by transaction applicants (TAs) and through the use of data sourced from watchlists as well as external sources of data such as news articles and social media postings and related content. In this regard, assessments as to whether the true identity of the TA matches one or more aggregated identities constructed by the system herein can be made wherein these aggregated identities may include information garnered from public or private sector activities, such as, to name a few, travel regulation and enforcement, employment eligibility, financial transaction eligibility, eligibility for social media participation, social media postings, news articles, images and various other types of content and data.

Inspection for any such correlations or the absence thereof can be conducted in real time as additional data sources become available and/or as they are periodically updated. As can be appreciated, the ingesting and processing of such data can be extremely difficult if not impossible to implement given the disparate sources of data as well as the sheer volume of data that needs to be processed and applied. As will be understood from the descriptions herein, the present embodiments apply machine learning and AI techniques and methodologies in order to construct a large number of individual aggregated identities which are tested against collective identities associated with TAs to determine the likelihood/probability of a match between the TA and an aggregated identity which is deemed to be a high risk in the context of the proposed transaction.

The probability (i.e., a watchlist candidacy) can be informed, for instance, based on combinations of information not considered by traditional watchlist review, such as social media presence and participation, publicly available documents such those administered by governmental entities, privately-held PII databases, and/or various publications (e.g., newspaper articles mentioning the TA, TA-authored writings, or TA curriculum vitae). In contrast with existing identity matching approaches which rely primarily on demographic factors, the present embodiments are distinguished by, at least, use of unsupervised semantic identity modeling along with graph-based clustering to associate identities with only minimal explicit attribute comparisons. In this way, the present embodiments can build holistic identity profiles combining both personal and network-ascertained contextual data. Determination of the probability in this way will be understood to, at least because of the continual nature of change of watchlist data and volume of TAs that can be assessed simultaneously in real time, be beyond the reach of calculations that could be reasonably performed in the human mind in a timely and accurate manner.

Modeling, as discussed herein, is measured in terms of accuracy, precision, recall and Area Under the Curve (AUC) metrics. Models can, optionally, be retrained frequently on an augmented dataset containing all new labeled identities received through human review feedback. In these instances, retraining evaluates model degradation via accuracy metrics on a selected one or more test sets. Evaluation results indicating significant degradation can trigger human-in-the-loop analysis and model architecture improvements to restore baseline metrics. To promote fairness and transparency, model training incorporates techniques such as adversarial debiasing along gender and racial attributes. Match decisions, for identities, include highest weighted factors to enable explainability around triggers that can be reasons for a match decision. In these regards, an ethics review committee can evaluate model implementations and behaviors at least annually to, for instance, ensure the aforementioned debiasing.

In some embodiments as are disclosed herein, natural language processing is employed to parse and process various textual content in order to generate aggregated identities stored in a database which also include information sourced from traditional watchlists. This enables the system according to embodiments herein to make comparisons of collective identities generated from input data provided by a TA as against aggregated identities developed by the system herein prior to the time that the transaction request is submitted. The determinations and the end results resulting therefrom may be provided to the system as feedback which enables the system herein to enhance its ability to make future recommendations regarding the probability of a TA identity being an individual tagged as not being a good risk for the proposed transaction. In addition, the system according to the embodiments herein may weight specific factors at different levels in connection with determination of probabilities provided in response to transaction requests. For example, certain predicate offenses associated with past financial matters may be immediately disqualifying.

Referring to FIG. 1, there is illustrated a Watchlist Comparison System (WCS) 100 according to one or more embodiments herein. WCS 100 may reside on a single cloud based server although it is also possible for various components of WCS 100 (as described herein) to reside on separate servers. By way of example, WCS 100 may be a computer implemented application which resides on a computing server. As will be apparent from the discussion herein, WCS 100 may include and/or implement all appropriate software (i.e., algorithms) and/or hardware (i.e., storage, processors) for carrying out its applicable identity correlation and related capabilities.

WCS 100 preferably includes Watchlist Analyzer 110, which itself is comprised of a number of modules as discussed further herein. Watchlist Analyzer 110 operates to detect patterning of identity data (and other data as discussed herein) that can be inspected for correlation to one or more collective identities associated with a TA. These detections are generated in response to requests originating from clients 195a, 195b . . . 195n. WCS 100 may be accessed through the internet or any other private or public network by one or more clients 195.

Each of clients 195 may be personal computers, laptops, handheld computing devices such as smartphones or tablets or any other device capable of providing the required connectivity and display. In some embodiments, a client 195 may be a computing application operated by a customer subscribed to WCS 100 which requires identity correlation data to process transaction requests. For example, client 195 may be an application or set of applications operated by a financial institution which processes requests for new credit cards made by customers of that financial institution. Herein, the terms "transaction," and "transaction request" can mean any event for which identity can be detected via analysis and scoring of information used in connection with the event, and include, for example, an application for a business or other type of account opening, an application providing an account information update, an application for a credit check, any type of application for a background check or identity verification, an application for an employment check or verification, etc. That is, the subject information for which identity may be detected can be information submitted during an initial stage (i.e., application stage) of an activity toward which an application is directed (e.g., account opening, employment, etc.).

In these regards, for instance, it is contemplated that embodiments herein may be employed to detect correlation of a collective identity associated with a TA on the one hand, to one or more data records associated with an aggregated identity developed by WCS 100, including that of a WE. For example, it is contemplated that embodiments herein can detect correlation for information submitted as part of any of the aforementioned applications such that the activity toward which an application is directed (e.g., an account opening) ought not to proceed.

Clients 195 interact with WCS 100 such that data may be communicated between them via application interface 120 and such that WCS 100 may process identity correlation requests made by clients 195 with regard to one or more of the above types of applications made by individuals or entities such as organizations. Application interface 120 may comprise one or more application programming interfaces (APIs) that permit applications associated with clients 195 to communicate with WCS 100.

Also shown in FIG. 1 is admin client 190. Admin client 190 may comprise a personal computers, laptops, handheld computing devices such as smartphones or tablets or any other similar device. Admin client 190 is operative to allow users to configure, maintain and support the operation of WCS 100. For example, a user may use admin client 190 to interact with WCS 100 to set parameters regarding what is required to invoke the correlations between a collective identity associated with a TA and one or more records contained in an aggregated identity database as discussed in further detail below.

External data stores 180 may also be present according to the teachings of one or more embodiments herein. External data stores 180 may comprise one or more external databases, data sets, systems, applications, rules bases and/or other sources of data which are used by WCS 100 to develop aggregated identities as further described herein. By way of example, external data stores 180 may comprise watchlist data sources, credit reporting databases, public and/or private demographic databases, reported and known fraud data, financial transaction data, social media data, articles and publications, social media platform content, public licensing databases as well as other sources of data useful to WCS 100 in developing aggregated identities as more fully described herein.

Returning now to the specific components of WCS 100, WCS 100 may include various components for correlating a collective identity associated with a TA to one or more aggregated identities. In these regards, it will be understood that correlation of the TA collective identity may be to one or more aggregated identity records developed by WCS 100 using data available from external data stores 180 such that, as will be understood from the discussions herein, a probability of a match for the TA as against an aggregated identity record may be discerned. Based on the attributes associated with the matched aggregated identity, a recommendation as to whether the proposed transaction may be allowed to proceed may also be provided.

WCS 100 may reside on one or more physical servers. These servers may include electronic storage, one or more processors, and/or other components. The servers may also include communication lines, or ports to enable the exchange of information with a network and/or other computing platforms. The servers may include a plurality of hardware, software, and/or firmware components operating together to provide the functionality attributed herein to WCS 100.

Electronic storage associated with the servers may comprise non-transitory storage media that electronically stores information. The electronic storage media of electronic storage may include one or both of system storage that is provided integrally (i.e., substantially non-removable) with servers and/or removable storage that is removably connectable to the servers via, for example, a port or a drive.

Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processors, information received from servers, information received from clients 195, and/or other information that enables the servers to function as described herein.

While an exemplary architecture is described above, it will readily be understood by one of skill in the art, that an unlimited number of architectures and computing environments are possible while still remaining within the scope and spirit of the present embodiments.

Returning now to the specific components of WCS 100 shown in FIG. 1, Watchlist Analyzer (hereinafter "WA 110") includes various components which are described hereinbelow. Operation(s) of each of these WA 110 components will be described in further detail below with reference to FIG. 2.

In one or more embodiments, WA 110 can include a data ingester 120, an identity builder 130, an artificial intelligence (AI) suite 140, an aggregator 150, an applicant identity receiver 160, and a probability notifier 170. One or more of these components can, via operation of the WCS 100, be cooperable with a constituent offense base 165 and an aggregated identity base 175 for purposes described herein.

More specifically, data ingester 120 can be cooperable with external data stores 180 to retrieve, for example, myriad watchlist data, social media data, articles and news stories associated with individuals, privately held identity data, geolocation data, publications such as books, curriculum vitae, newspapers, and other identity data for an individual such as arrest records, court documents, tax records, licensing data, etc.

Identity builder 130 can be cooperable with AI suite 140 to, for example, process data retrieved by data ingester 120 to recognize and resolve errors in ingested data. In these regards, the types of errors may be manifested by name misspellings or reversals, incompleteness in PII, duplicate name listing, etc. One or more instances of natural language processing (NLP), unsupervised and/or supervised machine learning may be implemented to resolve the errors. Still further, AI suite 140, may be configured to, in one or more embodiments and in accordance with data ingested by data ingester 120 and retrieved by identity builder 130, implement NLP to determine various characteristics for the data. For example, such a characteristic can be a sentiment (i.e., positive or negative) of an ingested news article. Should the sentiment be determined as being negative, identity builder 130 can operate to ascertain, for instance, whether the sentiment is associated with a financial crime, and if so, whether such financial crime correlates to a recognized predicate offense categorized by entities such as the Financial Action Task Force (FATF) on Money Laundering and catalogued in offense base 165. Based on any determination that the correlation exists, identity builder 130 can then extract entities mentioned in the news article. These and other capabilities of identity builder 130 are discussed in more detail in connection with FIGS. 2 and 12.

In some embodiments disclosed herein, listed WEs and extracted entity information from other data sources available through external data stores 180 may be combined to create and/or supplement aggregate identities which may be stored in aggregated identity base 175. This is implemented by aggregator 150 which may, in some cases, correlate ingested data to a predicate offense, in which case aggregator 150 may then forward that data to aggregated identity base 175, where it can be included in a record contained in aggregated identity base 175 and tagged as an identity associated with a predicate offense. In such case, when a TA collective identity is matched against that record and there is a high probability of a match, the transaction may be recommended to not proceed.

In connection with one or more of data continually ingested by data ingester 120, retrieved at applicant identity receiver 160, and stored in aggregated identity base 175, AI suite 140 can implement one or more iterations of unsupervised machine learning to derive watchlist tags which can be one or more combinations of data inspected by WCS 100, and stored in aggregated identity base 175. Additionally, AI suite 140, in use of such watchlist tags, can further implement one or more iterations of supervised machine learning to ascertain a watchlist candidacy for a TA, i.e., an applicant whose identity has been received via a client 195. Such a candidacy can be expressed as a probability that the identity of the TA collective identity matches that of an aggregated identity generated by the system of one or more of the present embodiments, (i.e., a correlation score), with increasing percentage in the probability indicating it is more likely than not that a match exists. For instance, the probability of 0.22 would be indicative that a match is unlikely as opposed to a probability of 0.95 indicating a match is virtually certain. Once ascertained, probability notifier 170 can report the probability together with reason codes (e.g., different age, different middle initial) to a requester implementing a client 195.

In these ways and through the apparatuses discussed above, WCS 100 can, for a request submitted by a subscriber to WCS 100, gauge and report the likelihood that an applicant of the subscriber embodying a TA is or is not a match for an aggregated identity derived from WE data as well as other data as more fully described herein.

Figure 2:
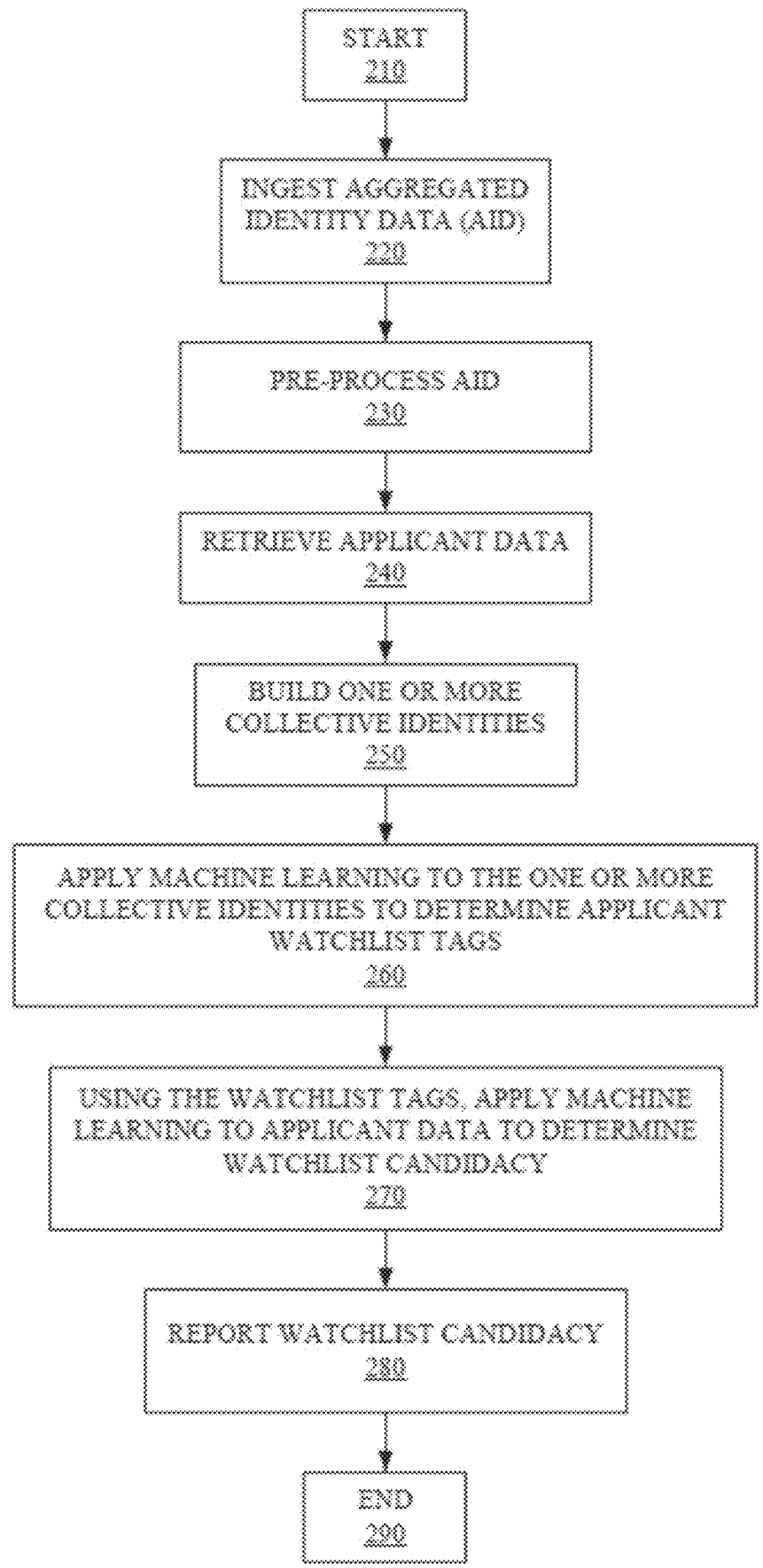
FIG. 2 illustrates a high-level flow diagram of a process of correlating an identity relative to a watchlist to determine watchlist candidacy, according to embodiments herein.

In referring to FIG. 2, there is shown a process implemented by WCS 100 when determining a watchlist candidacy for a TA that can be an applicant in one or more of a public and private sector transaction. The process can begin at 210 and be implemented whenever such a transaction is proposed by either the entity operating a client 195 or the TA.

At 220, WCS 100 can ingest aggregated identity data (AID) from, for example, external data stores 180 of FIG. 1. Here, the AID can include, for example, myriad watchlist data, social media data, privately held identity data, geolocation data, publications such as books, curriculum vitae, newspapers, and other identity data for an individual such as arrest records, court documents, tax records, licensing data, etc. In some implementations, the ingestion can be continual such that as watchlists and/or other data sources are updated, those updates are received and processed by WCS 100. In some implementations, the ingestion can be targeted such that only data having one or more PII corresponding to a TA's input identity can be retrieved via the ingestion.

At 230, WCS 100 can pre-process the AID ahead of receiving a TA's identity characteristics. For instance, ingested watchlist data having name misspelling, reversal (first, last, etc.) can be processed by the WCS 100 using NLP to correct the subject error. Where the AID includes other publicly available information such news articles, for example, WCS 100 can determine a sentiment of an article, i.e., its polarity, via, for example, one or more Support Vector Machines (SVM) and if the same is negative and involves a financial crime that is mappable to a predicate offense via, for example, Decision Trees, WCS 100 can implement NLP to capture contextual meaning and learn complex language patterns via artificial neural networks and transformers. WCS 100 can extract entities via transformer models and assign, via, for example, a Hidden Markov Model (HMM) and a Large Language Model (LLM), their roles according to the context of the article. Frameworks such as PyTorch, Keras, and TensorFlow can be incorporated to provide tools including layers, optimizers, and automatic differentiation to help implement and train one or more the models. This process is discussed in further detail in connection with FIGS. 12, 13 and 14.

At 240, WCS 100 can retrieve applicant data corresponding to a TA. Here, such data can include identity characteristics such as first and last name, date of birth (DOB), residence address, social security number, email address, phone number, crypto handle, national id., etc. Using these characteristics, WCS 100 can, at 250 and as is detailed with reference to discussion hereinbelow, build one or more collective identities for the TA that can contextualize an identity received from the TA so as to, for example, resolve falsehoods, expand upon, and/or uncover one or more identity characteristics provided by a TA during the applicant data retrieval. For instance, such contextualization may be derived from the ingested AID that can include, for example, myriad watchlist data, social media data, privately held identity data, geolocation data, publications such as books, curriculum vitae, newspapers, and other identity data for an individual such as arrest records, court documents, tax records, licensing data, etc.

At 260, WCS 100 uses the one or more collective identities of the TA to determine watchlist tags, (i.e., one or more traits and identity characteristics that, when compared to aggregated identities already generated by WCS 100, are "shared" with a WE such that the commonality is based on one or more same TA and aggregated identity characteristics). In determining the watchlist tags, WCS 100 can initially employ unsupervised learning (e.g., k-means, HMM, Apriori) to cluster and associate identity characteristics received from the TA into TA identity groupings. Here, WCS 100 can further employ a long short-term memory (LSTM) algorithm on the groupings to achieve further refinement and classification for the groupings.

At 270, WCS 100 can, using the LSTM refined identity groupings for the TA, determine a watchlist candidacy as a probability that the TA matches an aggregated identity. In doing so, WCS 100 is configured to employ one or more machine learning models to achieve the candidacy and reason codes for the candidacy in which the models are trained using supervised learning. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deeps, convolution neural network (CNN), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

At 280, and prior to ending processing at 290, WCS 100 can report the matching probability (between collective TA identity and one or more aggregated identities) together with accompanying reason codes to a requester implementing, for example, client 195. In some embodiments, WCS 100 can retrieve feedback from the requester as to whether the predicted probability and/or reason code(s) are appropriate and use the feedback to improve design for modeling at 270.

Figure 3:
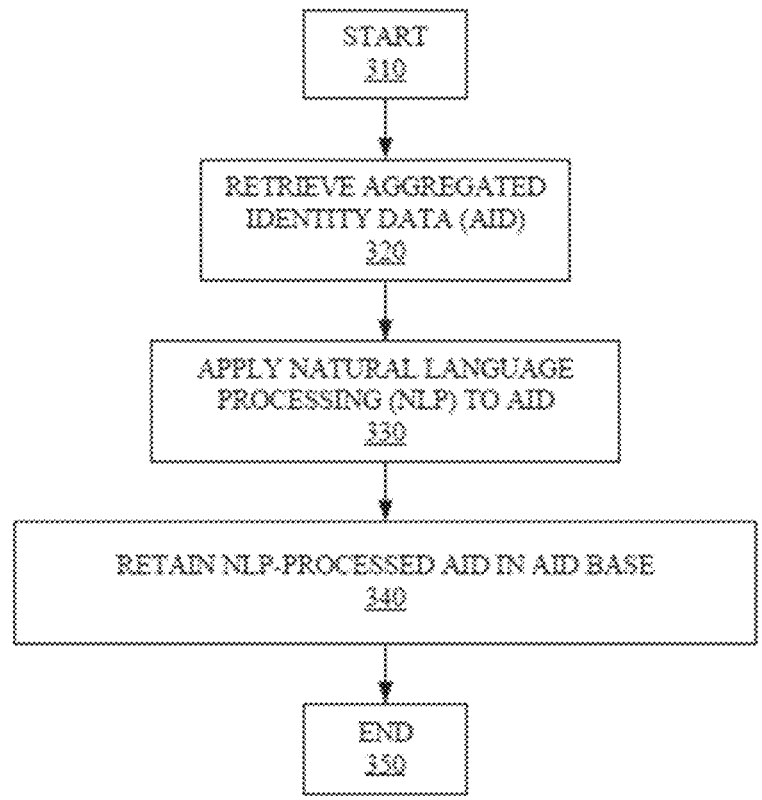
FIG. 3 illustrates a flow diagram of a process for pre-processing one or more aspects of a watchlist and various forms of aggregated identity data (AID), according to embodiments herein.

In referring to FIG. 3, there is illustrated a process undertaken by WCS 100 at 310 to pre-process watchlist and other aggregated identity data (AID). Here, such watchlist data and AID can be retrieved, at 320, through ingester 120 (see FIG. 1) continually throughout operation of WCS 100, or alternatively, such receipt can be triggered in accordance with receipt of TA identity characteristics. Upon receipt, WCS 100 can, as has been discussed, conduct processing to include rectification of various data error (spelling, reversals, etc.), and sentiment analysis in connection with various third party sources of textual content. In some embodiments, the processing can include extraction of imaging of entities, coreference for an entity, entity classification (i.e., role), predicate offense classification, and normalization of data. At 330, WCS 100 can apply NLP to the various AID in textual form to discern characteristics such as sentiment, predicate offense classification, role, etc. Further discussion of the application of NLP is provided below with respect to FIGS. 9 and 12. At 340 and prior to ending a pre-processing stage for watchlist data and AID, processed data (also referenced herein as aggregate identity data) can be retained in AID base 175 (see FIG. 1).

Relative to building a collective identity for a TA as discussed above, FIGS. 4-6 illustrate, respectively, intake of a TA's identity characteristics, construction of a corresponding collective identity, and resolution of that identity based on, for instance, AID processed according to FIG. 3.

Figure 4:
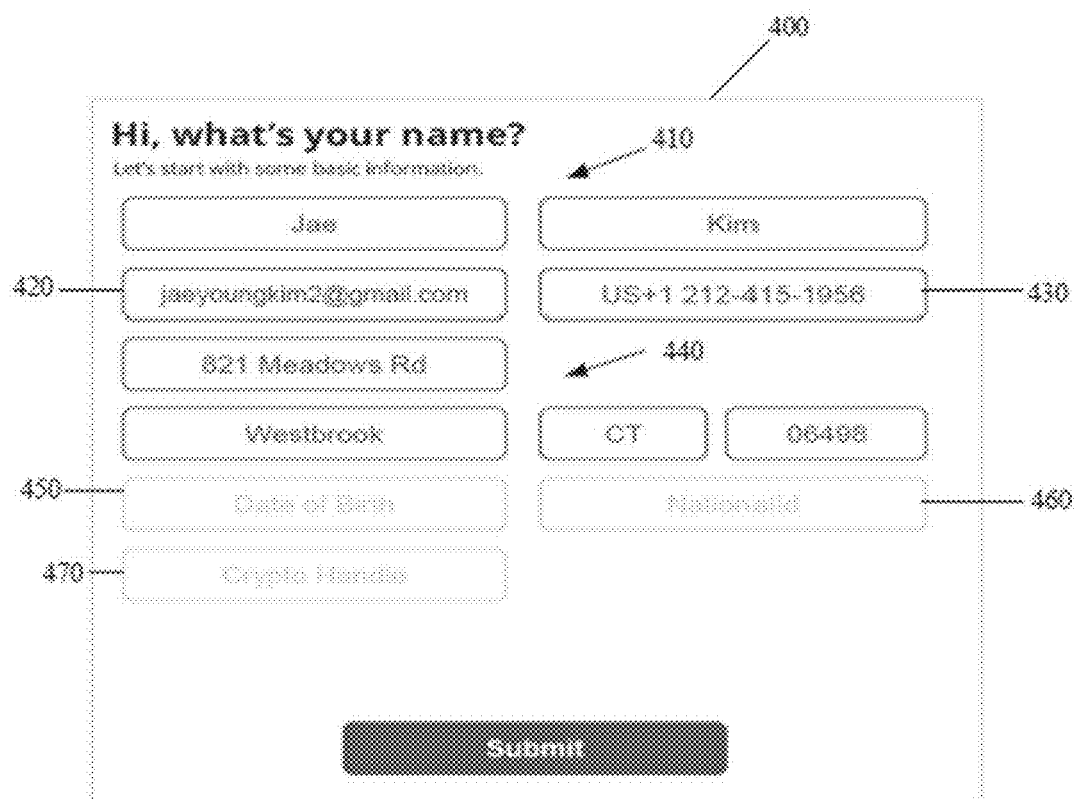
FIG. 4 illustrates a conceptual diagram of an interface for receipt of one or more identity characteristics, according to embodiments herein.

Thus, in referring to FIG. 4, there is shown a typical interface 400 administered through, for instance, a client 195, in which a TA may enter various identity characteristics, including name 410, email address 420, phone number 430, address 440, DOB 450, national id 460, and crypto handle 470.

Figure 5:
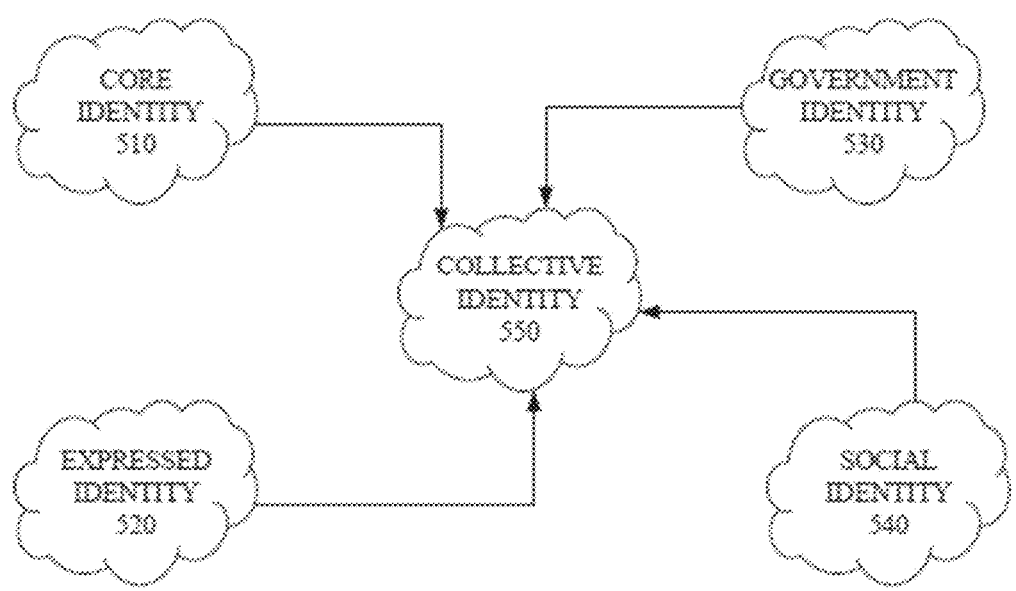
FIG. 5 illustrates a conceptual diagram of a process of building a collective identity for identity characteristics received according to FIG. 4, according to embodiments herein.

Using the identity characteristics obtained via the interface of FIG. 4, WCS 100 can, as is illustrated in FIG. 5, build a collective identity that serves to supplement the identity characteristics and add context to the TA identity characteristics already provided. In this way, WCS 100 can uncover an identity footprint for the TA that may serve to verify the provided identity characteristics, reveal falsity thereof, or supplement the TA identity. Examples of the various identities that can used to develop that footprint, and serve to build such a collective identity, are shown in FIG. 5, and include a core identity 510, an expressed identity 520, a government identity 530, and a social identity 540 some or all of which may contribute to a collective identity 550 derived by WCS 100. In these regards, each of the identities can, with respect to the TA identity characteristics already provided, be derived from continual ingestion and inspection of watchlist data and AID and/or when WCS 100 undertakes to inspect already processed watchlist data and AID gathered in aggregated identity base 175.

More particularly, core identity characteristics 510 can include, for example, name, DOB, gender, place of birth, nationality, ethnicity, facial imaging, and biometric data. Expressed identity characteristics 520 can include, for instance, any nickname, identity manipulation (e.g., name truncation or other alteration), cultural or group affiliation, languages spoken, travel history, behavioral patterns (e.g., work and/or social scheduling). A non-exhaustive listing of identity characteristics that can define a government identity 530 can include national identification, passport and licensing information, citizenship and any changes thereto, civil and/or criminal records, and immigration status. Social identity characteristics may be exemplified by email address, phone number, residence address, IP address, computing device identifiers, social media subscription and participation, crypto handle, socio-political affiliation, employment history (including position(s)), social connection (e.g., family, friends, associates), ancestry, and political engagement.

As will be evident from inspection for the above identities leading to construction of the collective identity 550, it will be appreciated that, for any one identity, WCS 100 can discern certain explicit identity features, such as name, DOB, etc. Additionally, WCS 100 can discern certain auxiliary identity characteristics based on ingested watchlist data and/or AID. A first type of these auxiliary characteristics includes implicit identity features determined by the WCS 100 implementing NLR on certain AID (e.g., news articles) to discern, for example, name etymology and/or age at time of publication of a news article. A second type of auxiliary characteristics includes, with respect to identity characteristics for a TA, features that may be resolved from intake and processing of identity characteristics aimed at determining identity verification. For a more detailed discussion of the aforementioned second type of auxiliary characteristics and their related usage, see commonly owned U.S. Pat. No. 10,956,916, entitled, "Self Learning Machine Learning Pipeline for Enabling Identity Verification," issued on Mar. 23, 2021, and U.S. Patent Application Publication No. 2023/0230088, entitled "Method and System of Predictive Document Verification and Machine Learning Therefor," each of which is incorporated by reference herein in its entirety.

A third type of auxiliary characteristics may include any type of financial crime data that may be implicated by the identity characteristics that are retrieved for the TA. In regard to the numerous types of inspection described above, it is to be understood that the WCS 100 may continually, in real time, cross-reference one or more types of inspected data to ensure alignment of the collective identity 550. For instance, WCS 100 may inspect and verify whether an implicitly derived age of an actor from an item of AID accurately corresponds to an age verified according to government records where such an actor is the TA. Likewise, WCS 100 may inspect whether geolocation data of a device used for social media participation corresponds with sufficient regularity to suggest that the data indicates a residence address for a TA as reported on a government issued form of identification. Thus, for these and other types of inspections of TA identity characteristics for processed watchlist data and processed AID, WCS 100 can resolve the TA's identity to uncover further TA identity characteristics.

Figure 6:
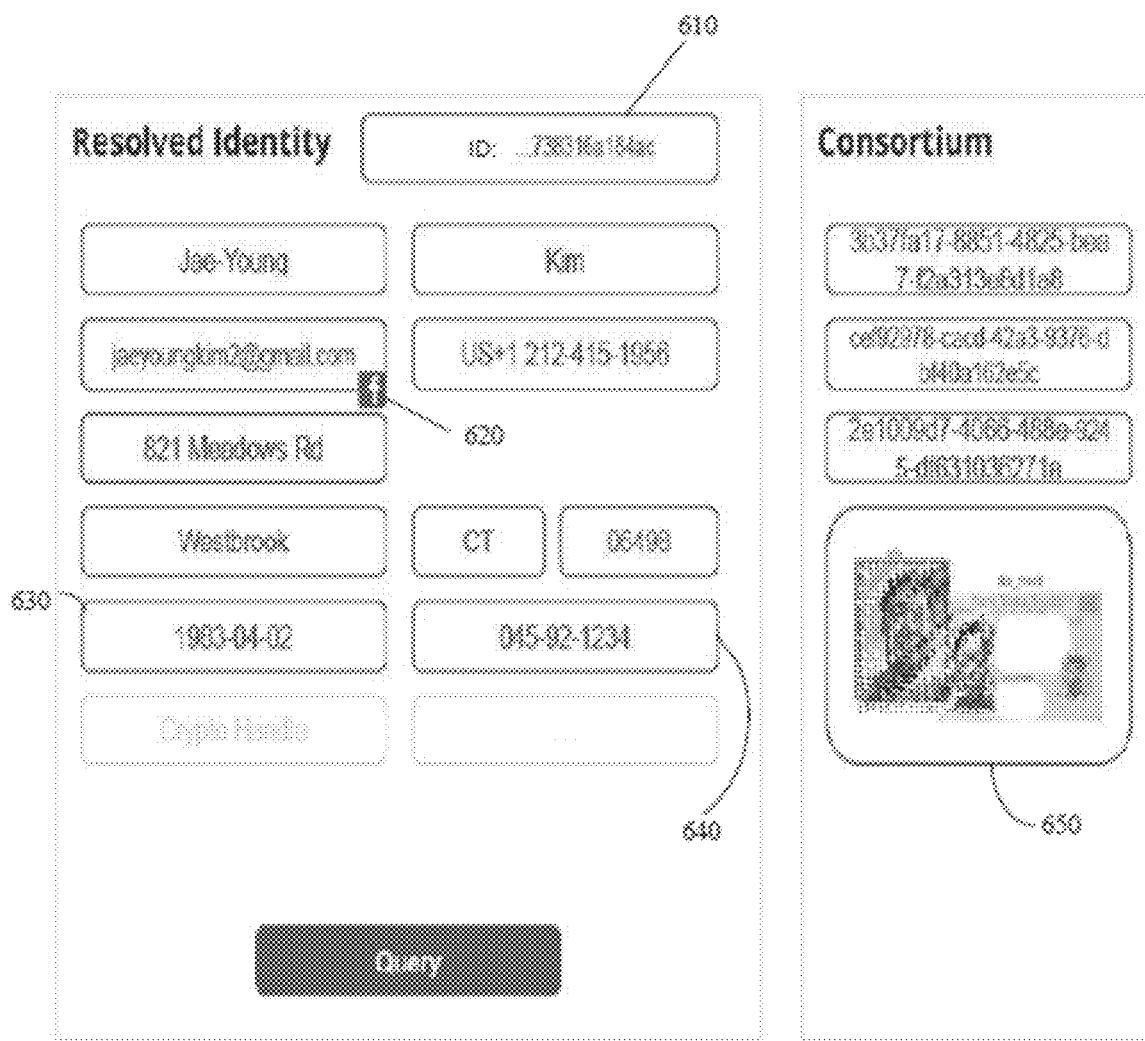
FIG. 6 illustrates a conceptual diagram of an interface demonstrating resolution for a collective identity determined according to FIG. 5, according to embodiments herein.

In referring to FIG. 6, there is shown an exemplary interface displaying such further TA characteristics that the above-discussed inspections can reveal using identity characteristics supplied by the TA as in FIG. 4. For instance, for a resolved identity assigned a unique identifier 610, WCS 100 can reveal social media participation 620, as well as DOB 630 and social security number 640. Additionally, one or more of these further identity characteristics in combination with those supplied by the TA in FIG. 4 can reveal facial imaging 650.

While discussion thus far has provided that the WCS 100 can build a collective identity for a TA, so, too, can an aggregated identity be built by WCS 100 for a known WE. In this regard, the aggregated identity can be built in the same manner as that of a TA since placement on a watchlist and AID implicating the WE can be similarly inspected by WCS 100. In one or more embodiments, aggregated identities are stored in AID base 175 as a set of records represented as rows in a table each with a record indicator. Each of these records, in turn, contains one or more features associated with the specific identity record such as the DOB, address, image data, applicable predicate offenses, etc. associated with the specific identity contained in the AID base 175. WCS 100 can build any such aggregated identity for any entity revealed by AID that has been ingested. As such, any aggregated identity corresponding to a WE or AID revealed entity can be stored in aggregated identity base 175 (see FIG. 1).

Figure 7:
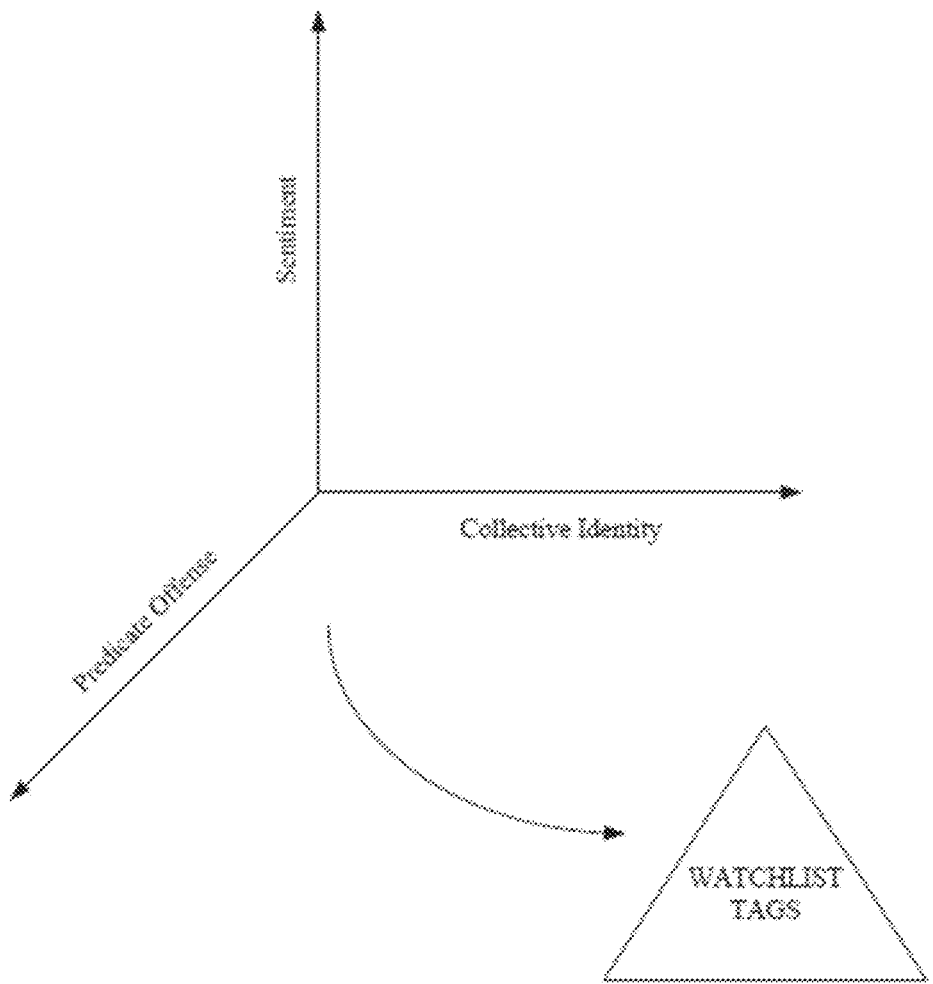
FIG. 7 illustrates a conceptual diagram of organization, for a collective identity, of aggregated identity data (AID), according to embodiments herein.

In these regards and when referring to FIG. 7, there is illustrated, for a collective identity of a WE or other AID revealed entity, the conceptual application of unsupervised learning together with LSTM modeling to form watchlist tags that may be used in determining watchlist candidacy for a TA. For example, based on appearance of a given entity's name in an item of AID having negative sentiment that is mappable to a predicate offense, such a collective identity can be discerned by WCS 100 to correspond to watchlist tags including, for example: middle-aged, male, surname Kim, human trafficking, Westbrook.

Figure 8:
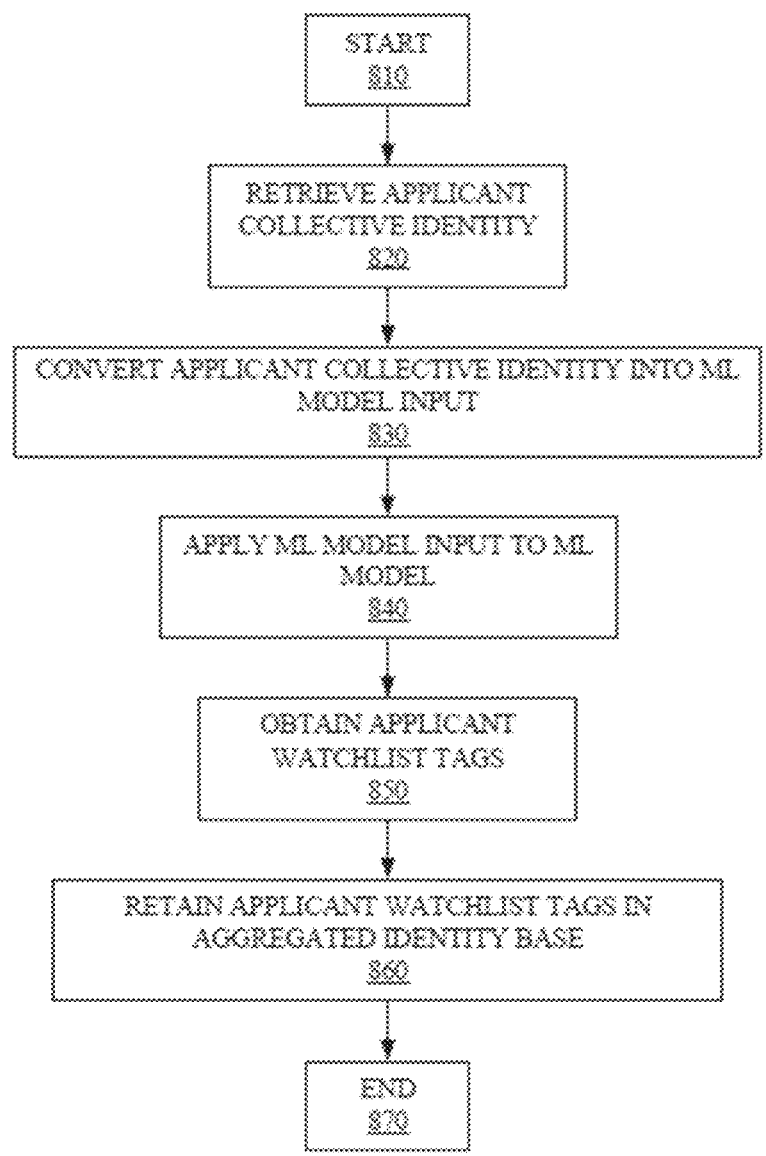
FIG. 8 illustrates a flow diagram for determining watchlist tags for a collective identity, according to embodiments herein.

Referring to FIG. 8, there is illustrated a process for determining watchlist tags with respect to a collective identity built for a TA. The process can begin at 810 and proceed to 820 whereat the WCS 100 can retrieve the collective identity of a TA. At 830, WCS 100 can convert the TA's collective identity into a machine learning (ML) model input. For example, an unsupervised machine learning model (e.g., k-means, HMM, Apriori) can be configured to receive a sparse vector with vector slots filled by characteristics for the collective identity of the TA. Values for the vector can be representative of the types of characteristics. At 840, WCS 100 can apply the input to the unsupervised model and additionally implement one or more LSTM algorithms on the model output to refine (i.e., classify commonality with WE identity characteristics) the same such that TA tags are obtained at 850. Once obtained, the tags can, prior to operations ending at 870, be retained at 860 in aggregated identity base 175 of FIG. 1 or in some other storage location accessible by WCS 100.

Figure 9:
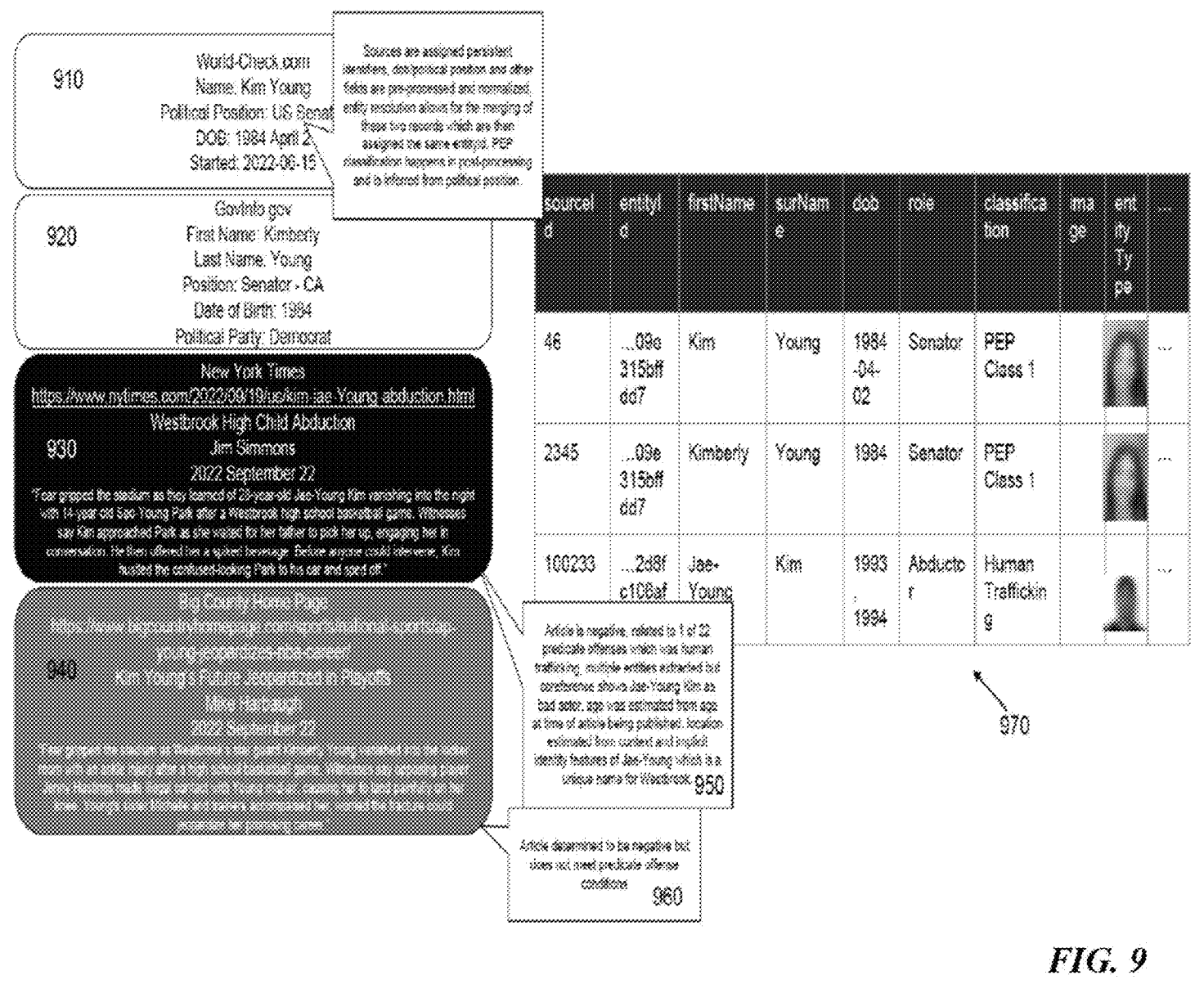

In referring to FIG. 9, there is illustrated a conceptual diagram of organizing one or more AID relative to determining watchlist tags for a TA based on a corresponding collective identity. For instance, for the TA "Jae Kim" serving as an applicant according to the interface of FIG. 4, WCS 100 may institute the variously shown analyses 910, 920, 930, and 940 on watchlist data and AID to uncover data that may be basis for watchlist tags against which the input "Jae Kim" may be compared. Thus, in accordance with inspection of the watchlist data and AID data processed by WCS 100, it can be appreciated that potential watchlist tags 970 can be discerned as, at least, a first name including "Jae," a surname of "Kim," a DOB of 1993 or 1994, a role of "Abductor," and a crime of "Human Trafficking," together with uncovered facial imaging indicating a tag of male gender. In this regard, WCS 100 can, for instance, confirm the potential tags as listed due to inspection of the watchlist data and AID that has been processed. For example, and with respect to analysis 930, implicit features (see 950) including DOB can be derived relative to stated age of "Jae-Young Kim" and the article publication date of 2022, article sentiment can be characterized as negative for a crime (relative to title of "Westbrook High Child Abduction") that can be mapped to a predicate offense of human trafficking, Kim can be discerned as a male (disqualifying politically exposed person (PEP) Kim in analyses 910, 920) via coreference to article discussion (e.g., "he") and confirmed by facial imaging, and role of "abductor" can discerned via activity described for Kim. By contrast, analysis 940 can be disregarded by WCS 100 as not available to provide watchlist tags since, at least, its negative sentiment (see 960) does not qualify for a crime corresponding to a predicate offense (i.e., AID is focused on sports).

Figure 10:
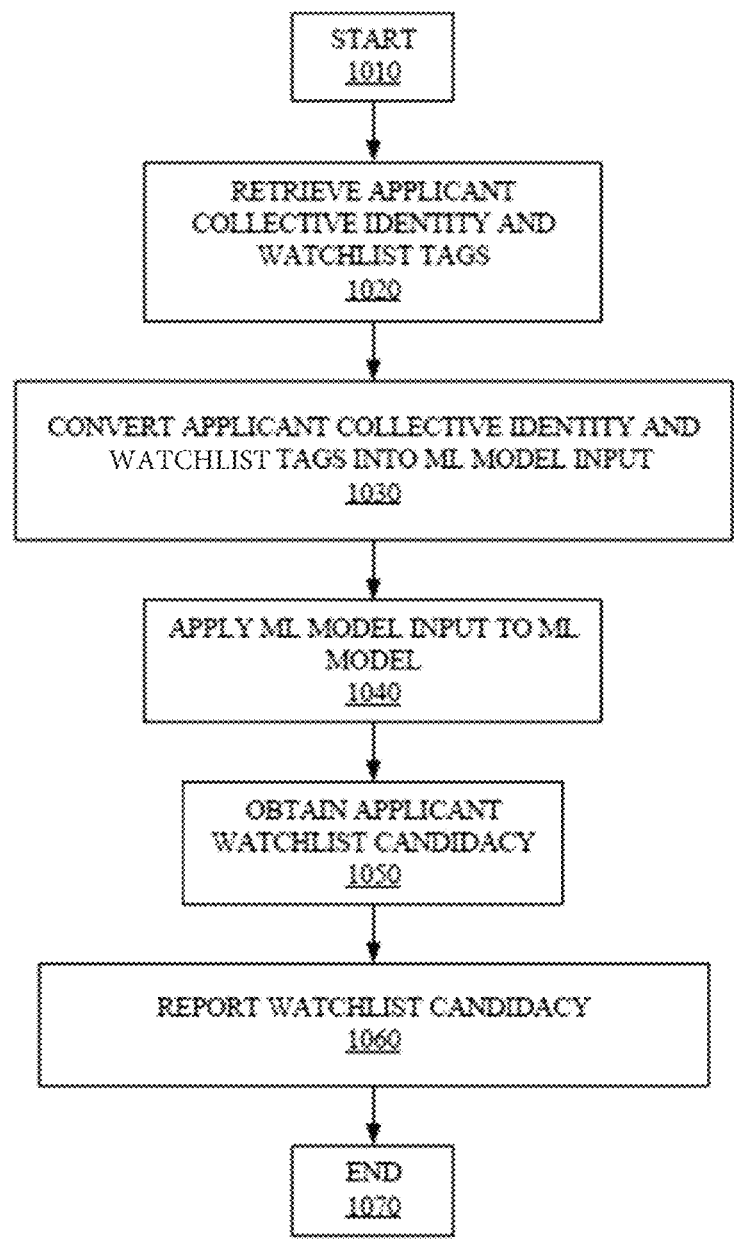
FIG. 10 illustrates a flow diagram for determining a watchlist candidacy using watchlist tags.

Referring to FIG. 10, there is illustrated a process for determining watchlist candidacy using watchlist tags corresponding to a TA where, as discussed herein, the tags express a commonality of identity characteristics between a TA and a WE. The process can begin at 1010 and proceed to 1020 whereat WCS 100 can retrieve a TA's collective identity and watchlist tags determined for that identity. At 1030, WCS 100 can convert the collective identity and the watchlist tags into an ML model input, such as similarly described above in regard to entry into a sparse vector. At 1040, WCS 100 can apply the input to a ML model. Here, the model can be trained with supervised learning and use training data that can be obtained from a history of TA collective identities and corresponding watchlist tags. More specifically, each item of the training data can include an instance of a prior TA collective identity matched to one or more watchlist tags. The matching can be performed according to a predetermined algorithm configured to receive TA identity characteristics from a historical record and pair it with results of watchlist feature generation for the record, such as whether a collective identity provoked AID sentiment triggering classification to a predicate offense. For example, prior records can show and/or describe instances of whether a TA engaged in a predicate offense, etc. During the model training, a representation of the collective identity (e.g., histograms of facial images, values representing PII, etc.) can be provided to the model (e.g., each as an element of a vector). Then, the output from the model, i.e., predicted watchlist candidacy, can be compared to the actual matched watchlist candidacy corresponding to a collective identity and, based on the comparison, the model can be modified, such as by changing weights between nodes of the neural network or parameters of the functions used at each node in the neural network (e.g., applying a loss function). After applying each of the pairings of the inputs (collective identities) and the desired outputs (watchlist features representing watchlist candidacy as derived according to, at least, comparison for watchlist tags as discussed herein) in the training data and modifying the model in this manner, the model is trained to evaluate new instances of TA collective identity in order to determine watchlist candidacy for a new TA.

At 1050, WCS 100 can obtain a TA's candidacy which, as discussed above, may be expressed as probability that the TA is or is not a match to a current WE. The candidacy can be a function of the model's application of predetermined weightings for sourcing of watchlist data and AID. For instance, government issued data may be weighted more heavily than that provided by the private sector. In another instance, matching for tags relative to collective identities may be a function of weighting different PII portions of a collective identity (e.g., name, DOB, gender, ethnicity, etc.) differently such that, for instance and non-exhaustively, name is weighted more heavily than is gender. At 1060, and prior to ending operations at 1070, WCS 100 can report the watchlist candidacy (any applicable reason codes) to a requester implementing a client 195 as in FIG. 1. As part of the reporting, WCS can, in some implementations, receive feedback as to whether the candidacy is believed to be correct based on, for example, the requester's own knowledge of the TA. Should, for instance, the feedback contravene the reported candidacy, WCS 100 can evaluate the feedback according to predetermined cleansing and/or clustering to determine whether the feedback can be trusted sufficiently to warrant updating of the model in 1040.

For example, labels pointing out the same type of prediction error may be grouped together. Such grouping assists in identifying any existing systematic gaps in the modeling performed according to the WCS 100. Clustering can be performed using algorithms such as K-means, hierarchical clustering, etc. Useful dimensions to cluster on may include type of error, data subsets, model confidence, prediction similarity, etc. Feedback labels that do not fit well into any cluster may be set aside for manual review by the WCS 100. In this regard, a human examines these outliers to understand if any common themes exist. Outliers may indicate unusual model failures or rare data subsets. If new types of systematic errors are identified, new clusters can be formed. Otherwise, the outlier labels remain unclustered and still remain valuable as individual feedback. As will be appreciated, the clusters and outliers provide insight into model limitations that can drive iterative feature engineering to address gaps in model design. For example, such engineering may include adding features to better detect subgroups of data for which model performance was not optimal. The improved model is then deployed, generating opportunity for new feedback, and the loop continues. In one or more instances, the model may be updated in various respects (e.g., model parameters such as assigned weightings); if not, model parameters (such as assigned weightings) are maintained. It will be readily understood to one of skill in the art that the features discussed in the present embodiments are merely exemplary and many other features could be used in connection with the teachings of the present disclosure without departing from the scope or spirit thereof.

Figure 10A:
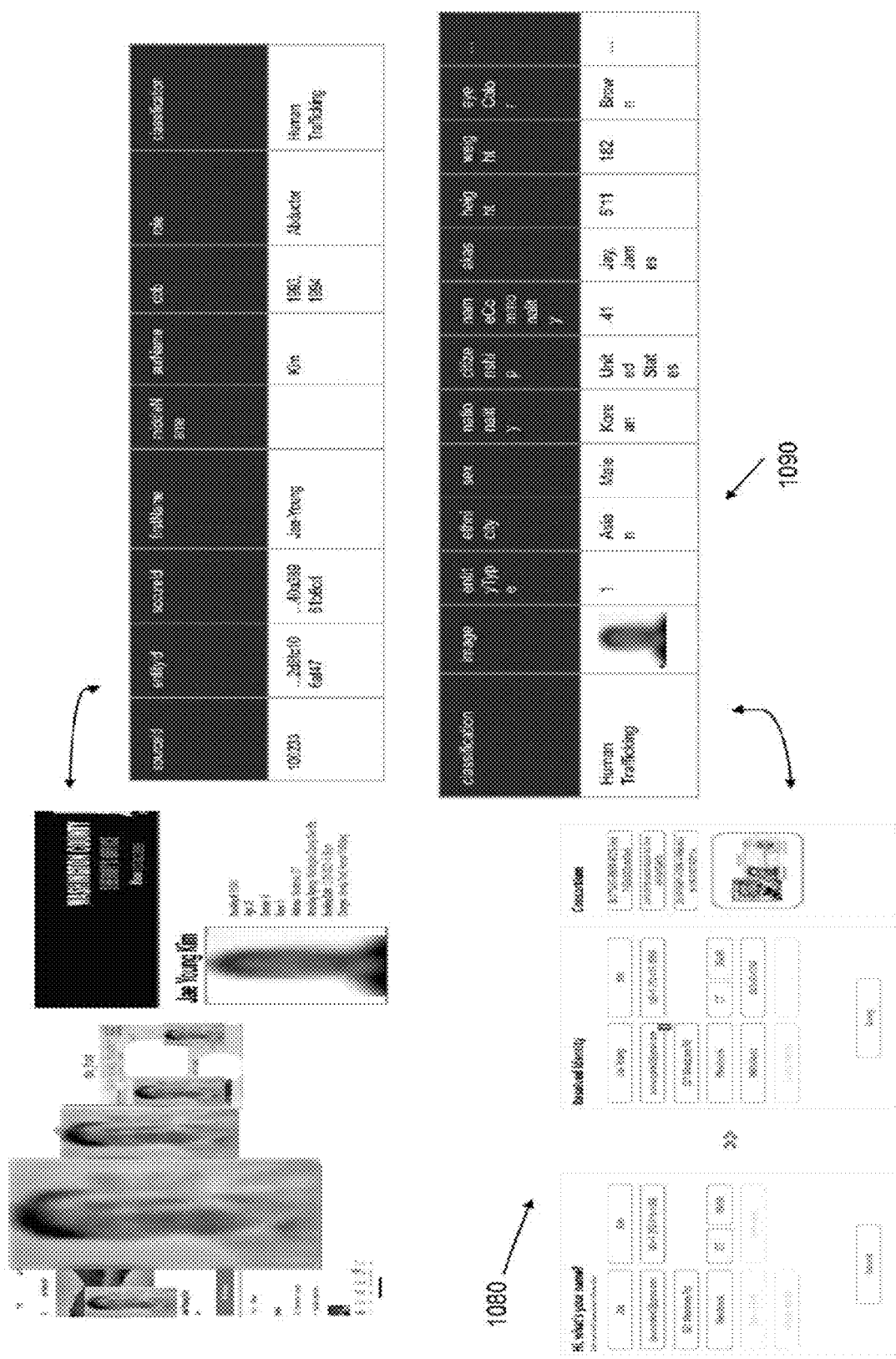
FIG. 10A illustrates a conceptual diagram demonstrating a comparison, for collective identities, that informs a watchlist candidacy.

Referring to FIG. 10A, there is illustrated a conceptual diagram demonstrating a comparison, for collective identities, that informs a watchlist candidacy as may be determined according to FIG. 10. That is, as has been learned from the discussion above, WCS 100 may build one or more collective identities respectively corresponding to both a TA and a WE. Here, the comparison(s) 1080, 1090 of the TA Jae Young Kim, born in 1983, between WE Jae Young Kim, born in 1993, buttressed by facial imaging confirming the age discrepancy, yields the result that, though other identity characteristics (e.g., name, ethnicity, residence city, gender, etc.) match, that TA Kim is, because of the age discrepancy, unlikely to be a WE in this instance of comparison. Thus, it will appreciated based on the discussions herein that, because of the derivations of the example collective identities as informed by their incumbent implicit features derived from AID, that determined watchlist tags can serve to optimize one-to-one-comparison for identity characteristics on which watchlist candidacy may be grounded.

Figure 11:
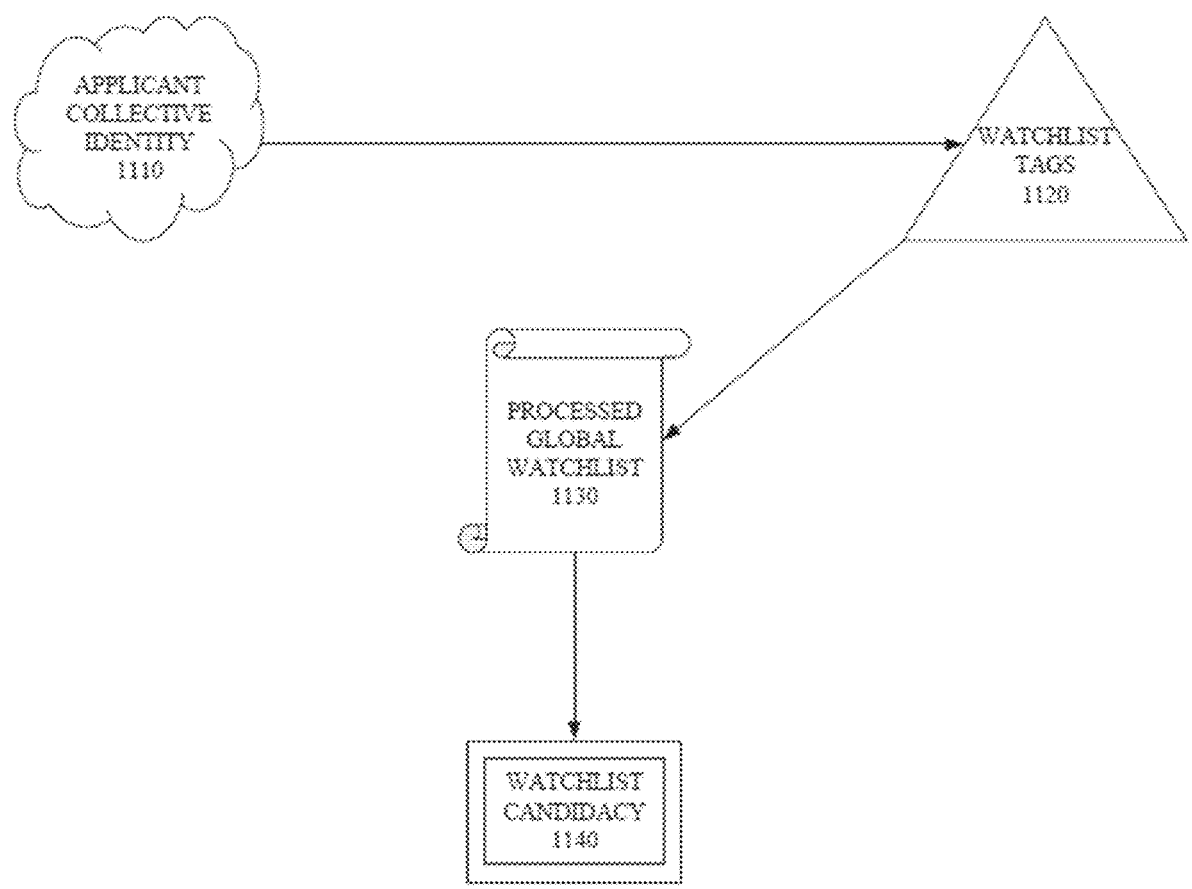
FIG. 11 illustrates a high-level conceptual diagram demonstrating determination of a watchlist candidacy.

Referring to FIG. 11, there is illustrated a conceptual diagram, in accordance with at least FIGS. 7-8 and 10, for determining a watchlist candidacy. In these regards, WCS 100 can retrieve identity characteristics for one or more of a TA and a WE so as to arrive at a respective collective identity 1110. Using these identities, WCS 100 can determine watchlist tags 1120 which can be constructed using identity characteristics for the identities according to, for instance, FIG. 7. In other words, each of such tags can be a matrix of collected or aggregated identity characteristics (e.g., [name, residence; DOB, social media participation, social media participation, geolocation]). Once the tags are ascertained, comparison for a TA whose identity corresponds to the tags can be made against processed global watchlist data 1130 compiled by WCS 100 as described herein. Using this comparison, a watchlist candidacy for a TA can be determined (see, e.g., FIG. 10).

In these ways, and in view of the entirety of the discussions presented hereinabove, it can be understood that WCS 100 does not merely conduct screening for watchlist data, but uses that data to find, in real time and for continually received data, new connections and associations for TAs and WEs that are distilled to logical components in order to more accurately define a watchlist candidacy.

Figure 12:
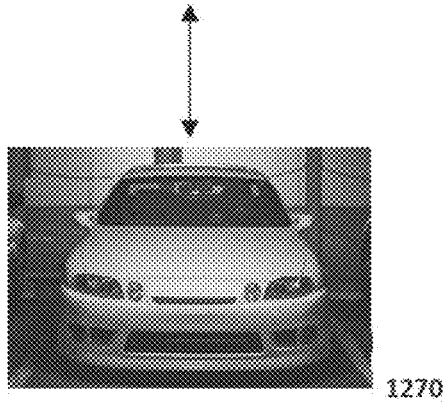
FIG. 12 illustrates an exemplary collective identity generated from a TA and associated with an automobile as used in connection with a watchlist candidacy methodology for an exemplary web based automobile purchasing service.

With reference now to FIG. 12, an exemplary collective identity for an automobile being considered for sale by an individual to an entity operating an automobile purchasing services is shown. As will be apparent to one of skill in the art, this scenario is merely exemplary and many other scenarios are possible without departing from the scope and spirit of the present disclosure. For example, the sale could be from company to company instead of from an individual to company. Similarly, the object of the sale could be anything of value such as an airplane, a boat, a home, a building, a piece of equipment etc. The key objective to provide the most possible certainty that the item being sold and purchased is verified to be what it is and that it is not stolen, subject to unknown liens, damaged or otherwise different from what it is purported to be.

In this use case example, an individual desiring to sell his or her car to the purchasing service will be required to provide certain information via the purchasing service website user interface. The type of information requested will vary depending on the specific application but by way of example, in connection with the individual seller acting in the capacity of a TA, the individual may be asked to provide some or all of the following information: name, address, date of birth, social security number, employment information, driver's license number, requested sales price and various information about the subject automobile such as state of registration, years owned, location of purchase, color, make, model, VIN #, plate number, accident history, known damage and mechanical issues, etc.

The information provided by the individual is then provided to the system of the present invention as identity characteristics and the teachings described herein are applied to augment and correlate the information provided by the individual. In order to do this, as described above, external sources of data may be used (including parsing and processing of such data) in order to create a collective identity such as the exemplary collective identity 1200 shown in FIG. 12. Collective identity 1200 may include various identity characteristics (1210-1260) related to the automobile proposed to be sold. Some of these identity characteristics may be derived from information provided to the system of the present invention via the purchasing service application as provided by the seller. In addition, the system of the present invention may supplement the collective identity for the automobile with identity characteristics derived from external sources and the processing of data obtained therefrom. Collective identity 1200 may also be assigned an ID number such as is shown in FIG. 12.

As shown in FIG. 12, collective identity 1200 may consist of identity characteristics such as the automobile state of registration 1210, the license plate number 1220 of the automobile, the automobile model 1230, the automobile title number 1240, the automobile model year 1250 and the name of the seller seeking to sell the subject automobile 1260. Collective identity 1200 may also include the date of the request for sale, the date that the request was submitted to the system of the present invention and/or some other date relevant to the proposed transaction.

In some embodiments, collective identity 1200 may be supplemented with one or more images 1270 of the subject vehicle. This image(s) may be provided from the seller via the purchasing service website and/or may be sourced from external data sources where images of the vehicle can be correlated with other known identity characteristics associated with the vehicle. Through the use of collective identity 1200 (which may possibly include image data 1270) derived from information provided by the seller and an aggregated identity next discussed, the system of the present invention may function, in this example, to assist the automobile buying service in determining whether a vehicle offered for sale is less than ideal for purchase because of various issues such as being stolen, having unreported damage, the actual identity characteristics of the vehicle not being as described, being used in connection with criminal activity and the like.

Figure 13:
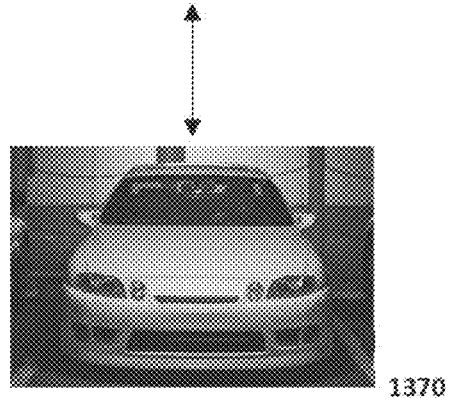
FIG. 13 illustrates an exemplary aggregated identity generated from a WE and associated with an automobile as used in connection with a watchlist candidacy methodology for an exemplary web based automobile purchasing service.

With reference now to FIG. 13, an aggregated identity 1300 associated with an automobile is shown. Aggregated identity 1300 may be assigned an ID number as shown. The system of the present invention may develop a set of aggregated identities associated with automobiles such as the aggregated identity 1300. These aggregated identities may be developed prior to a transaction request or they may be developed at the time of a transaction request, or both. In this example, aggregated identity may comprise the following identity characteristics:—automobile state of registration 1310, automobile license plate number 1320, automobile VIN number 1330, automobile make 1340, automobile model year 1350 and a REPORTED STOLEN tag 1360. In some embodiments, aggregated identity 1300 may also include one or more images 1370 of the associated vehicle.

By way of example, the REPORTED STOLEN identity characteristic 1360 of aggregated identity 1300 could be sourced as a result of the processing of external data available to the system of the present invention. In one example, news articles including "police blotter" reports could be sourced and parsed to identify vehicles that have been reported as stolen. Natural language processing can be used with any of this textual data via trained models to identify vehicles which are likely to have been stolen, been in accidents, tied to crimes etc. Of course, databases designed specifically to list and identify stolen vehicles and/or other attributes tied to vehicles can also be used to supplement and inform the aggregated identity 1300. In the event of an aggregated identity including a "yes" for REPORTED STOLEN, the proposed transaction may be denied or at least flagged for manual intervention.

In some embodiments, the system of the present invention may use image matching techniques to assess whether the image(s) 1270 from the collective identity 1200, possibly supplied by the seller, is/are identical to or at least a very close match to the image(s) 1370 in aggregated identity. In the absence of a minimum close match between images, the sales transaction may be denied (or flagged for manual review) due to the possibility of fraud or some other irregularity.

According to the teachings described herein, matching between collective identity 1200 and one or more aggregated identities 1300 may be assessed based on the overall set of identity characteristics and one or more trained models may be implemented to return a metric which guides the automobile purchasing service in determining whether or not to proceed with a proposed purchase of an automobile.

With reference now to FIGS. 14 and 15, another use case involving the potential funding of and/or investment into a corporate entity is discussed. Again, the specific use case is merely exemplary and other embodiments employing the teachings of the present disclosure are certainly possible without departing from the scope and spirit of the claimed invention. In this case, FIG. 14 shows a collective identity 1400 tied to a corporate entity seeking funding/investment from a funding/investment source or related service and FIG. 15 shows an exemplary aggregated identity 1500 associated with a corporate entity that may be correlated with collective identity 1400 according to the teachings herein. Many other possibilities exist in connection with applying the teachings herein to identities being entities as opposed to individuals and the current discussion is merely exemplary. For example, the entity could be an organization, group, educational institution or some other entity type. Similarly, the object of the transaction could be anything related to that entity such as a credit assessment, a proposed business transaction with that entity, a purchase from that entity, etc. The key objective to provide the most possible certainty that the entity seeking to engage in the proposed transaction is verified to be what it is and that it is not known to have previous negative histories or events or is otherwise different from what it is purported to be.

In this use case example, entity seeking to obtain financing will be required to provide certain information via the financing service website user interface. The type of information requested will vary depending on the specific application but by way of example, in connection with the entity seeking financing acting in the capacity of a TA, the entity may be asked to provide some or all of the following information: entity name, address, date of formation, tax ID number, state where formed, type of entity, requested financing terms, previous financing events as well as other information.

The information provided by the entity is then provided to the system of the present invention and the teachings described herein are applied to augment and correlate the information provided by the entity. In order to do this, as described above, external sources of data may be used (including parsing and processing of such data) in order to create a collective identity such as the exemplary collective identity 1400 shown in FIG. 14. Collective identity 1400 may include various identity characteristics (1410-1460) related to the entity seeking financing. Some of these identity characteristics may be derived from information provided to the system of the present invention via the financing service application as provided by the entity. In addition, the system of the present invention may supplement the collective identity for the entity with identity characteristics derived from external sources and the processing of data obtained therefrom. Collective identity 1400 may also be assigned an ID number such as is shown in FIG. 14.

As shown in FIG. 14, collective identity 1400 may consist of identity characteristics such as the type of entity 1410, the entity name 1420, the names of principals associated with the entity 1430, the number of employees 1440, previous bankruptcy events, if any 1450 and the date of formation of the entity 1460. Collective identity 1400 may also include the date of the request for financing, the date that the request was submitted to the system of the present invention and/or some other date relevant to the proposed transaction.

Through the use of collective identity 1400 derived from information provided by the entity and an aggregated identity next discussed, the system of the present invention may function, in this example, to assist financing service in determining whether the entity seeking financing is less than ideal for such a transaction because of various issues such as previous bankruptcies, issues with known principals associated with the entity, an inability to correlate the collective identity with a known aggregated identity and the like.

With reference now to FIG. 15, an aggregated identity 1500 associated with an entity is shown. Aggregated identity 1500 may be assigned an ID number as shown. The system of the present invention may develop a set of aggregated identities associated with entities such as the aggregated identity 1500. These aggregated identities may be developed prior to a transaction request or they may be developed at the time of a transaction request or both. In this example, aggregated identity may comprise the following identity characteristics: type of entity 1510, entity name 1520, entity state 1530, principals 1540, previous funding events 1550 and a BANKRUPTCY FILING tag 1560.

By way of example, the BANKRUPTCY FILING identity characteristic 1560 of aggregated identity 1500 could be sourced as a result of the processing of external data available to the system of the present invention. In one example, news articles including bankruptcy reporting news sources could be obtained and parsed to identify entities that have been reported as having made a bankruptcy filing. Natural language processing can be used with any of this textual data via trained models to identify entities which are not good risks for financing for one or more reasons. Of course, databases designed specifically to list and identify non-credit worthy entities and/or other attributes tied to entities can also be used to supplement and inform the aggregated identity 1500. In the event of an aggregated identity including a "yes" for BANKRUPTCY FILING, the proposed transaction may be denied or at least flagged for manual intervention.

According to the teachings described herein, matching between collective identity 1400 and one or more aggregated identities 1500 may be assessed based on the overall set of identity characteristics and one or more trained models may be implemented to return a metric which guides the financing service in determining whether or not to proceed with a proposed financing with an entity.

Figure 16:
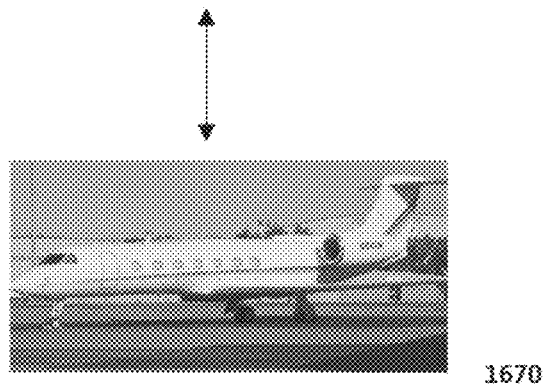
FIG. 16 illustrates an exemplary collective identity generated from a TA and associated with an aircraft as used in connection with a watchlist candidacy methodology in the context of identifying potential risks associated in connection with the transport of dangerous items.
Figure 17:
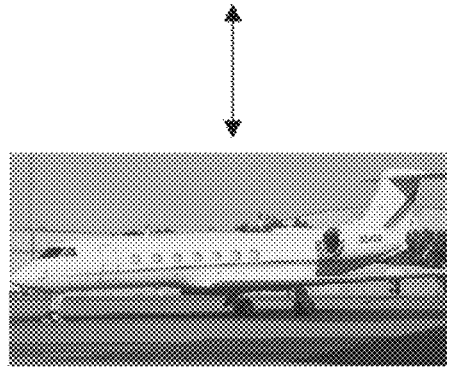
FIG. 17 illustrates an exemplary aggregated identity generated from a WE and associated with an aircraft as used in connection with a watchlist candidacy methodology in the context of identifying potential risks associated in connection with the transport of dangerous items.

With reference now to FIGS. 16 and 17, another use case which may be implemented in connection with the present disclosure is now discussed. FIG. 16 illustrates an exemplary collective identity for an aircraft which is being monitored to identify a risk of transporting prohibited goods to sanctioned countries or entities or otherwise unreported dangerous goods. As will be apparent to one of skill in the art, this scenario is merely exemplary and many other scenarios are possible without departing from the scope and spirit of the present disclosure. For example, the mode of transport could be a vehicle such as a car, truck, or train rather than an aircraft. Similarly, the vehicle/aircraft could be monitored for something other than identifying a risk of carrying prohibited or dangerous goods The key objective to provide the most possible certainty that an aircraft/vehicle currently being assessed (TA) is the same as the one being monitored because of a concern (WE).

In this use case example, a user of the service implementing the system of the present invention will be required to provide certain information via the monitoring service website user interface or via an alternative application interface. The type of information requested will vary depending on the specific application but by way of example, in connection with a user assessing a current aircraft that might be preparing for a departure from an airport in the capacity of a TA, the user may be asked to provide some or all of the following information: aircraft tail number, aircraft make and model, aircraft serial number, planned and/or previous flight plans or flown routes, aircraft year of manufacture, etc.

The information provided by the user is then provided to the system of the present invention and the teachings described herein are applied to augment and correlate the information provided by the user. In order to do this, as described above, external sources of data may be used (including parsing and processing of such data) in order to create a collective identity such as the exemplary collective identity 1600 shown in FIG. 16. Collective identity 1600 may include various identity characteristics (1610-1660) related to the aircraft being monitored. Some of these identity characteristics may be derived from information provided to the system of the present invention via the monitoring service application as provided by the user. In addition, the system of the present invention may supplement the collective identity for the aircraft with identity characteristics derived from external sources and the processing of data obtained therefrom. Collective identity 1600 may also be assigned an ID number such as is shown in FIG. 16.

As shown in FIG. 16, collective identity 1600 may consist of identity characteristics such as the aircraft tail number 1610, aircraft make 1620, aircraft model 1630, aircraft serial number 1640, aircraft's most common flight route 1650 and a tag 1660 identifying the aircraft as one that should be monitored due to a potential risk. Collective identity 1600 may also include the date of the request for the monitoring check, and/or some other date relevant to the monitoring activity.

In some embodiments, collective identity 1200 may be supplemented with one or more images 1670 of the subject aircraft. This image(s) may be provided from the user via the monitoring service website/application and/or may be sourced from external data sources where images of the aircraft can be correlated with other known identity characteristics associated with the aircraft. Through the use of collective identity 1600 (which may possibly include image data 1670) derived from information provided by the user and an aggregated identity next discussed, the system of the present invention may function, in this example, to determine whether an aircraft currently being assessed for risk is the same as an aircraft previously identified as carrying a risk including the potential for attempting to transport dangerous or prohibited items and/or attempting to transport items to prohibited destinations.

With reference now to FIG. 17, an aggregated identity 1700 associated with an aircraft is shown. Aggregated identity 1700 may be assigned an ID number as shown. The system of the present invention may develop a set of aggregated identities associated with aircraft such as the aggregated identity 1700. These aggregated identities may be developed prior to a transaction request or they may be developed at the time of a transaction request or both. In this example, aggregated identity may comprise the following identity characteristics: aircraft make 1710, aircraft ADS-B transmission ID 1720, aircraft year of manufacture 1730, registered owner(s) of the aircraft 1740, aircraft radio call sign 1750 and a RISK TAG 1760. In some embodiments, aggregated identity 1700 may also include one or more images 1770 of the associated aircraft.

By way of example, the RISK TAG identity characteristic 1760 of aggregated identity 1700 could be sourced as a result of the processing of external data available to the system of the present invention. In one example, governmental or private databases and/or news articles with respect to aircraft status and activities could be sourced and parsed to identify aircraft that are to be monitored due to risk. Natural language processing can be used with any of this textual data via trained models to identify aircraft which might be used to transport prohibited or dangerous materials and/or items to prohibited destinations. Of course, databases designed specifically to list and identify risky aircraft and/or other attributes tied to aircraft can also be used to supplement and inform the aggregated identity 1700. In the event of an aggregated identity including a "yes" for the RISK TAG, action may be taken to prevent an aircraft from departing, searching the aircraft and/or some other kind of action or intervention.

In some embodiments, the system of the present invention may use image matching techniques to assess whether the image(s) 1670 from the collective identity 1600, possibly supplied by the user of the present system, is/are identical to or at least a very close match to the image(s) 1770 in an aggregated identity. In the absence of a minimum close match between images, the aircraft may be viewed as not the same as the one being monitored and no manual intervention may be recommended. Of course, this recommendation will also depend on matching characteristics of other identity characteristics and how the trained model assesses the same.

According to the teachings described herein, matching between collective identity 1600 and one or more aggregated identities 1700 may be assessed based on the overall set of identity characteristics and one or more trained models may be implemented to return a metric which guides the monitoring service in making recommendations.

It will be recognized by one of skill in the art that the system and methodologies disclosed herein can be applied in various contexts. For example, it is possible to implement the systems and methodologies of the present disclosure in connection with transaction requests as they are presented to the system in connection with decision making (i.e. as TAs are considered for watchlist candidacy in connection with these TAs seeking to process transactions). It is also possible for the systems and methodologies of the present disclosure to be implemented in connection with monitoring services and related applications. In this case, specific individuals and/or sets of individuals may be monitored over time with respect to their identities being added to a watchlist or similar database. Aggregated identities and collective identities and the leveraging thereof as described herein may also be applied in the context of such monitoring services and/or applications.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A method of assessing the desirability of a proposed transaction, the method comprising:
   developing an aggregated identity in response to a request for said proposed transaction by processing aggregated identity data in connection with a plurality of watchlist entities (WEs) via natural language processing (NLP) on information corresponding to one or more of a plurality of identity sources, said aggregated identity data being received continually in real time;
   receiving identity characteristics corresponding to a transaction applicant (TA) associated with said proposed transaction;
   developing, based on said identity characteristics, collective identity data for said TA in connection with determining watchlist candidacy comprising a probability that said aggregated identity matches said collective identity data for said TA;
   determining watchlist candidacy for said TA employing said collective identity data and said aggregated identity data developed via NLP on said information corresponding to one or more of said plurality of identity sources, the watchlist candidacy being based on an application of a machine learning model to (a) one or more watchlist tags tagged to said TA in response to said one or more watchlist tags comprising a same predicate offense involvement indicated by said aggregated identity data for said aggregated identity and said identity characteristics for said collective identity data of said TA, and (b) said collective identity data, said machine learning model including an application of predetermined weightings to one or more of the aggregated identity data;
   reporting said watchlist candidacy to a requestor of the assessing of said desirability of said proposed transaction;
   denying said proposed transaction in response to said watchlist candidacy indicating a substantial match between said aggregated identity and said collective identity data for said TA; and
   receiving feedback on an accuracy of said watchlist candidacy from said requestor,
      wherein, in response to an evaluation of said feedback, said machine learning model is updated for one or more subsequent iterations of said determining a watchlist candidacy for said TA.

2. The method of claim 1 wherein one or more identity characteristics associated with said aggregated identity data or said collective identity data are disqualifying for said proposed transaction.

3. The method of claim 1 wherein said TA comprises an entity.

4. The method of claim 3 wherein said TA comprises a corporation or a limited liability company.

5. The method of claim 3 wherein said identity characteristics comprise a bankruptcy event associated with said entity.

6. The method of claim 1 wherein said TA comprises a physical object.

7. The method of claim 6 wherein said TA comprises an automobile, an aircraft or a vessel.

8. The method of claim 7 wherein said identity characteristics comprise accident history data.

9. The method of claim 8 wherein said proposed transaction comprises monitoring of said aircraft with respect to risk of transporting prohibited items.

10. The method of claim 7 wherein said proposed transaction comprises monitoring of said vessel with respect to risk of transporting prohibited items.

11. The method of claim 1 wherein said TA comprises real estate.

12. The method of claim 1 wherein said proposed transaction comprises a proposed financing for a TA comprising a corporate entity.

13. The method of claim 1 wherein said proposed transaction comprises a proposed financing for a TA comprising an individual.

14. The method of claim 1 wherein said proposed transaction comprises a proposed purchase of a TA comprising an automobile.

15. A computing system for assessing the desirability of a proposed transaction, the computing system comprising:
one or more processors; and
one or more memories storing instructions that, when executed by the one or more processors, cause the computing system to perform a process comprising:
developing an aggregated identity in response to a request for said proposed transaction by processing aggregated identity data in connection with a plurality of watchlist entities (WEs) via natural language processing (NLP) on information corresponding to one or more of a plurality of identity sources, said aggregated identity data being received continually in real time;
receiving identity characteristics corresponding to a transaction applicant (TA) associated with said proposed transaction;
developing, based on said identity characteristics, collective identity data for said TA in connection with determining watchlist candidacy comprising a probability that said aggregated identity matches said collective identity data for said TA;
determining watchlist candidacy for said TA employing said collective identity data and said aggregated identity data developed via NLP on said information corresponding to one or more of said plurality of identity sources, the watchlist candidacy being based on an application of a machine learning model to (a) one or more watchlist tags tagged to said TA in response to said one or more watchlist tags comprising a same predicate offense involvement indicated by said aggregated identity data for said aggregated identity and said identity characteristics for said collective identity data of said TA, and (b) said collective identity data, said machine learning model including an application of predetermined weightings to one or more of the aggregated identity data;
reporting said watchlist candidacy to a requestor of the assessing of said desirability of said proposed transaction;
denying said proposed transaction in response to said watchlist candidacy indicating a substantial match between said aggregated identity and said collective identity data for said TA; and
receiving feedback on an accuracy of said watchlist candidacy from said requestor,
wherein, in response to an evaluation of said feedback, said machine learning model is updated for one or more subsequent iterations of said determining a watchlist candidacy for said TA.

16. The computing system of claim 15 wherein one or more identity characteristics associated with said aggregated identity data or said collective identity data are disqualifying for said proposed transaction.

17. The computing system of claim 15 wherein said TA comprises an entity.

18. The computing system of claim 17 wherein said TA comprises a corporation or a limited liability company.

19. The computing system of claim 17 wherein said identity characteristics comprise a bankruptcy event associated with said entity.

20. The computing system of claim 15 wherein said TA comprises a physical object.

21. The computing system of claim 20 wherein said TA comprises an automobile, an aircraft or a vessel.

22. The computing system of claim 21 wherein said identity characteristics comprise accident history data.

23. The computing system of claim 22 wherein said proposed transaction comprises monitoring of said aircraft with respect to risk of transporting prohibited items.

24. The computing system of claim 21 wherein said proposed transaction comprises monitoring of said vessel with respect to risk of transporting prohibited items.

25. The computing system of claim 15 wherein said TA comprises real estate.

26. The computing system of claim 15 wherein said proposed transaction comprises a proposed financing for a TA comprising a corporate entity.

27. The computing system of claim 15 wherein said proposed transaction comprises a proposed financing for a TA comprising an individual.

28. The computing system of claim 15 wherein said proposed transaction comprises a proposed purchase of a TA comprising an automobile.

* * * * *